US012643157B2

(12) United States Patent
Kuriyama

(10) Patent No.: US 12,643,157 B2
(45) Date of Patent: Jun. 2, 2026

(54) TURNING TOOL AND TURNING DEVICE

(71) Applicant: Sumitomo Electric Industries, Ltd., Osaka (JP)

(72) Inventor: Hiromitsu Kuriyama, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 684 days.

(21) Appl. No.: 17/926,629

(22) PCT Filed: Mar. 25, 2021

(86) PCT No.: PCT/JP2021/012600
§ 371 (c)(1),
(2) Date: Nov. 21, 2022

(87) PCT Pub. No.: WO2021/235084
PCT Pub. Date: Nov. 25, 2021

(65) Prior Publication Data
US 2023/0182214 A1 Jun. 15, 2023

(30) Foreign Application Priority Data

May 22, 2020 (JP) ................................. 2020-089667

(51) Int. Cl.
| | |
|---|---|
| *B23B 27/16* | (2006.01) |
| *B23B 29/24* | (2006.01) |
| *B23B 49/00* | (2006.01) |
| *B23Q 17/09* | (2006.01) |

(52) U.S. Cl.
CPC .............. *B23B 29/24* (2013.01); *B23B 27/16* (2013.01); *B23B 49/00* (2013.01); *B23Q*

*17/0966* (2013.01); *B23Q 17/0971* (2013.01); *B23B 2260/128* (2013.01); *B23B 2270/48* (2013.01)

(58) Field of Classification Search
CPC ........... B23B 27/14; B23B 2260/1285; B23B 2260/128; B23B 29/12; B23B 29/125; B23Q 17/0971; B23Q 17/0985; B23Q 17/09; B23Q 17/0952; B23Q 17/0966; B23Q 17/12; B23Q 2717/003
See application file for complete search history.

(56) References Cited

U.S. PATENT DOCUMENTS

| | | | | | |
|---|---|---|---|---|---|
| 4,555,955 | A | * | 12/1985 | Morgan | ................. G01L 5/1627 |
| | | | | | 73/862.06 |
| 7,710,287 | B2 | * | 5/2010 | Lange | .................. B23Q 1/0009 |
| | | | | | 700/175 |
| 2002/0083805 | A1 | * | 7/2002 | Lundblad | .............. F16F 15/005 |
| | | | | | 82/163 |
| 2006/0085092 | A1 | | 4/2006 | Redecker et al. | |

(Continued)

FOREIGN PATENT DOCUMENTS

| | | | | | |
|---|---|---|---|---|---|
| CN | 109175419 | A | * | 1/2019 | ........ B23Q 17/0952 |
| CN | 110103077 | A | | 8/2019 | |

(Continued)

*Primary Examiner* — Nicole N Ramos
(74) *Attorney, Agent, or Firm* — XSENSUS LLP

(57) ABSTRACT

A turning tool includes a power receiving coil, a sensor, and a wireless unit. The power receiving coil receives power transmitted from a power transmitting coil in a non-contact manner. The sensor is electrically connected to the power receiving coil. The wireless unit transmits data detected by the sensor to an outside.

12 Claims, 32 Drawing Sheets

(56)         References Cited

U.S. PATENT DOCUMENTS

2008/0030355  A1     2/2008  Lange et al.
2008/0129246  A1     6/2008  Morita et al.
2010/0007215  A1     1/2010  Sakuma
2017/0213644  A1     7/2017  Lee et al.

FOREIGN PATENT DOCUMENTS

DE          10163734  A1  *   7/2003   .........  B23Q 17/0961
EP           2636473  A1       9/2013
GB           2577077  A   *   3/2020   ...........  B23B 27/145
JP          S583365  B2       1/1983
JP          H01212131  A       8/1989
JP          2003-200333  A       7/2003
JP          2004267353  A   *   9/2004
JP          2008-120239  A       5/2008
JP          2010-41906  A       2/2010
JP          2013-184275  A       9/2013
JP          2016-63683  A       4/2016
WO          2020/066085  A1       4/2020
WO       WO-2020241628  A1  *  12/2020   .............  B23B 27/00

* cited by examiner

TURNING TOOL AND TURNING DEVICE

CROSS-REFERENCE TO RELATED APPLICATIONS

The present application is based on PCT filing PCT/JP2021/012600, filed Mar. 25, 2021, which claims priority to Japanese Patent Application No. 2020-089667, filed May 22, 2020, the entire contents of each are incorporated herein by reference.

TECHNICAL FIELD

The present disclosure relates to a turning tool and a turning device.

BACKGROUND ART

Japanese Patent Laying-Open No. 2013-184275 (PTL 1) discloses a turning tool attached to a turret.

CITATION LIST

Patent Literature

PTL 1: Japanese Patent Laying-Open No. 2013-184275

SUMMARY OF INVENTION

A turning tool according to the present disclosure includes a power receiving coil, a sensor, and a wireless unit. The power receiving coil receives power transmitted from a power transmitting coil in a non-contact manner. The sensor is electrically connected to the power receiving coil. The wireless unit transmits data detected by the sensor to an outside.

BRIEF DESCRIPTION OF DRAWINGS

FIG. 11 is a schematic plan view illustrating a constitution of a turning tool according to a fifth embodiment.

FIG. 28 is a schematic plan view illustrating a constitution of a turret of the third embodiment.

DESCRIPTION OF EMBODIMENT

Figure 1:
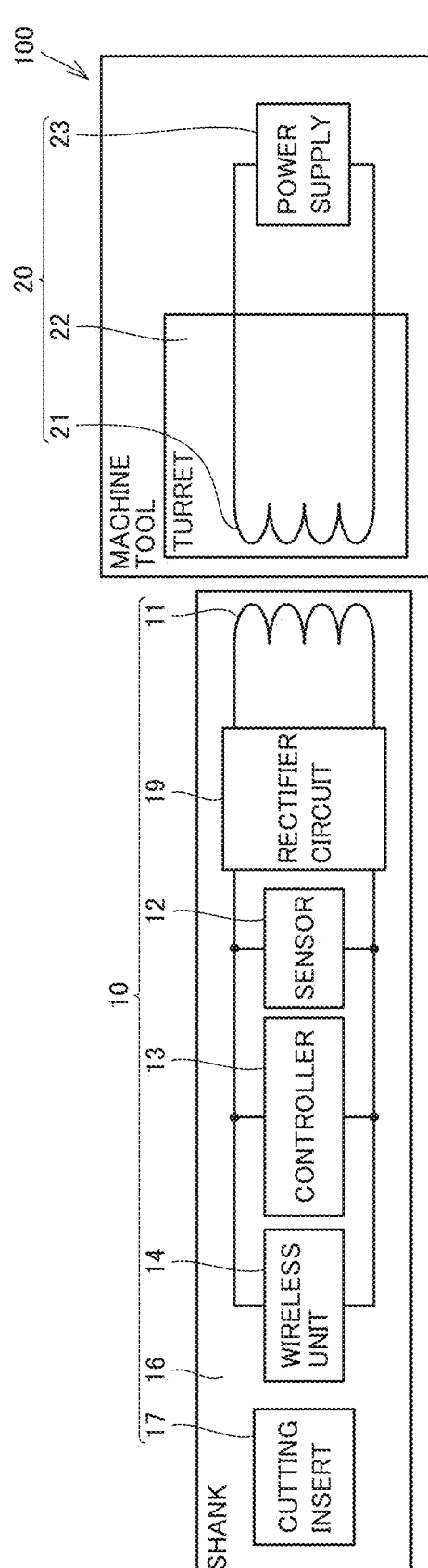
FIG. 1 is an entire constitution diagram illustrating a constitution of a turning device according to a first embodiment.

Problem to be Solved by the Present Disclosure

A system that analyzes data from a sensor attached to a turning tool and diagnoses a state of the turning tool is being developed. For example, the data detected by the sensor is wirelessly sent to an external diagnostic system. In the diagnosis system, for example, a life of the turning tool is predicted.

The turning tool may be used while attached to a turret. In order to supply power to the sensor attached to the turning tool, it is conceivable to supply the power from an external power supply by wire using wiring. However, when the power is supplied to the sensor using the wiring, the wiring may be entangled with the turret in rotating the turret, and there is a fear that the rotation of the turret is hindered.

It is also conceivable to supply the power from the external power supply to the sensor through an electric contact. However, sometimes the turning tool turns a work material while using a coolant liquid. In this case, it is difficult to ensure high waterproofness in the electric contact.

An object of the present disclosure is to provide a turning tool and a turning device capable of preventing hindrance of the rotation of the turret while ensuring the high waterproofness.

Advantageous Effect of the Present Disclosure

According to the present disclosure, the turning tool and the turning device capable of preventing the hindrance of the rotation of the turret while ensuring the high waterproofness can be provided.

Description of Embodiments of the Present Disclosure

First, embodiments of the present disclosure will be listed and described.

(1) A turning tool 10 according to the present disclosure includes a power receiving coil 11, a sensor 12, and a wireless unit 14. Power receiving coil 11 receives power transmitted from a power transmitting coil 21 in a non-contact manner. Sensor 12 is electrically connected to power receiving coil 11. Wireless unit 14 transmits data detected by sensor 12 to an outside. Thus, the power can be supplied to sensor 12 in a non-contact manner. Accordingly, the hindrance of the rotation of a turret 22 can be prevented while the high waterproofness is secured.

(2) Turning tool 10 of (1) further includes a cutting insert 17 and a shank 16 that holds cutting insert 17. Power receiving coil 11 is disposed in shank 16. Thus, an area of power receiving coil 11 can be increased.

(3) According to turning tool 10 of (2), a first recess 30 is provided on a side surface 1 of shank 16. Power receiving coil 11 is disposed in first recess 30. Consequently, side surface 1 of shank 16 can be pressed against turret 22 while power receiving coil 11 does not come into contact with turret 22. As a result, turning tool 10 can be firmly attached to turret 22.

(4) Turning tool 10 of (3) further includes a first nonmetallic film 38 that is disposed in first recess 30 and covers power receiving coil 11. Accordingly, the waterproof property of power receiving coil 11 can be enhanced.

(5) According to turning tool 10 of (4), first recess 30 includes a first side wall surface 31 contiguous to side surface 1 and a first bottom surface 32 contiguous to first side wall surface 31. First nonmetallic film 38 includes a first surface 51 opposite to first bottom surface 32 and a second surface 52 on an opposite side of first surface 51. Second surface 52 is located between side surface 1 and first bottom surface 32 in a direction along first side wall surface 31. Accordingly, first nonmetallic film 38 can be prevented from protruding from first recess 30 to ride on side surface 1 of shank 16. Consequently, side surface 1 of shank 16 can be firmly attached to turret 22.

(6) According to turning tool 10 of any one of (2) to (5), power receiving coil 11 includes a first power receiving coil unit 101 and a second power receiving coil unit 102 separated from first power receiving coil unit 101. Shank 16 includes a first side surface 1 and a second side surface 2 that is contiguous to first side surface 1 and is inclined with respect to first side surface 1. First power receiving coil unit 101 is provided in first side surface 1. Second power receiving coil unit 102 is provided in second side surface 2. Accordingly, the power can be efficiently received from turret 22 regardless of the surface attached to turret 22.

(7) According to turning tool 10 of (2), power receiving coil 11 includes a plurality of power receiving coil units 111 disposed along a longitudinal direction of shank 16. Accordingly, even when shank 16 is cut to shorten a protrusion amount of shank 16, the power can be received from turret 22.

(8) According to turning tool 10 of (7), first recess 30 in which each of the plurality of power receiving coil units 111 is disposed is provided in side surface 1 of shank 16. Turning tool 10 includes first nonmetallic film 38 that is disposed in first recess 30 and covers each of the plurality of power receiving coil units 111. Accordingly, the waterproof property of each of the plurality of power receiving coil units 111 can be enhanced.

(9) According to turning tool 10 of (8), first recess 30 includes first side wall surface 31 contiguous to side surface 1 and first bottom surface 32 contiguous to first side wall surface 31. First nonmetallic film 38 includes a first surface 51 opposite to first bottom surface 32 and a second surface 52 on an opposite side of first surface 51. Second surface 52 is located between side surface 1 and first bottom surface 32 in a direction along first side wall surface 31. Accordingly, first nonmetallic film 38 can be prevented from protruding from first recess 30 to ride on side surface 1 of shank 16. Consequently, side surface 1 of shank 16 can be firmly attached to turret 22.

(10) According to turning tool 10 of (8) or (9), first nonmetallic film 38 is a translucent resin. When first nonmetallic film 38 is made of a translucent resin, a user of turning tool 10 can visually recognize the position of each of the plurality of power receiving coil units 111 located below first nonmetallic film 38. Consequently, when shank 16 of turning tool 10 is cut, the cutting position can be visually recognized without exposing each of power receiving coil units 111.

(11) According to turning tool 10 of (8) or (9), first nonmetallic film 38 is a non-translucent resin. A mark 4 indicating a cutting position of shank 16 is provided on shank 16. When first nonmetallic film 38 is made of a non-translucent resin, the user of turning tool 10 cannot visually recognize the position of each of the plurality of power receiving coil units 111 located below first nonmetallic film 38. Mark 4 indicating the cutting position is provided on shank 16, the cutting position can be recognized without exposing each of power receiving coil units 111 even when first nonmetallic film 38 is a non-translucent resin.

(12) According to turning tool 10 of any one of (7) to (11), an interval between two adjacent power receiving coil units 111 among the plurality of power receiving coil units 111 becomes shorter with increasing distance from cutting insert 17. Accordingly, even when shank 16 is cut to shorten the protruding amount of shank 16, the decrease in the power from turret 22 can be prevented.

(13) According to turning tool 10 of any one of (7) to (11), the plurality of power receiving coil units 111 are alternately arranged on both sides of a straight line parallel to the longitudinal direction. Accordingly, when turning tool 10 is attached to turret 22, the power can be received from turret 22 even when the position of shank 16 is shifted from the center of power transmitting coil 21.

(14) According to turning tool 10 of (7), shank 16 includes a front end face 61 to which cutting insert 17 is attached, a rear end face 62 located on an opposite side of front end face 61, and side surface 1 located between front end face 61 and rear end face 62. Each of the plurality of power receiving coil units 111 includes a front end 63 opposite to the front end face 61 and a rear end 64 opposite to rear end face 62. Each of the plurality of power receiving coil units 111 is inclined with respect to side surface 1 such that a distance between front end 63 and side surface 1 is smaller than a distance between rear end 64 and side surface 1. Thus, when turning tool 10 is attached to turret 22, the surface of power receiving coil 11 is inclined in a central axis direction of turret 22. Consequently, even power receiving coil unit 111 disposed to protrude from turret 22 can receive the power from turret 22.

(15) Turning device 100 of the present disclosure includes turning tool 10 of any one of (1) to (14) and turret 22 to which turning tool 10 is attached. Turret 22 includes power transmitting coil 21 that transmits the power to power receiving coil 11. Thus, the power can be supplied from turret 22 to turning tool 10.

(16) According to turning device 100 of (15), power transmitting coil 21 is disposed so as to wind around a rotation axis 29 of turret 22. Thus, even when turning tool 10 is attached to any position in the circumferential direction of a mounting surface 45, the power can be supplied from power transmitting coil 21 to power receiving coil 11.

(17) According to turning device 100 of (15) or (16), turret 22 includes mounting surface 45 opposite to turning tool 10. A second recess 40 is provided in mounting surface 45. power transmitting coil 21 is disposed in second recess 40. Consequently, shank 16 can be pressed against mounting surface 45 of turret 22 while power transmitting coil 21 does not come into contact with turning tool 10. As a result, turning tool 10 can be firmly attached to turret 22.

(18) According to turning device 100 of (17), turret 22 includes second nonmetallic film 46 that is disposed in second recess 40 and covers power transmitting coil 21. Accordingly, the waterproof property of power transmitting coil 21 can be enhanced.

(19) According to turning device 100 of (18), second recess 40 includes second side wall surface 41 contiguous to mounting surface 45 and second bottom surface 42 contiguous to second side wall surface 41. Second nonmetallic film 46 includes a third surface 53 opposite to second bottom surface 42 and a fourth surface 54 located on an opposite side of third surface 53. Fourth surface 54 is located between mounting surface 45 and second bottom surface 42 in a direction along second side wall surface 41. Accordingly, second nonmetallic film 46 can be prevented from protruding from second recess 40 to ride on mounting surface 45 of turret 22. Consequently, shank 16 can be firmly attached to mounting surface 45 of turret 22.

(20) According to turning device 100 of (15), power transmitting coil 21 is installed in a plurality of power transmitting coil units 211 disposed around rotation axis 29 of turret 22. Accordingly, the power can be supplied only to power transmitting coil unit 211 that requires the electric supply. As a result, power consumption can be reduced.

(21) In turning device 100 of (20), turret 22 includes mounting surface 45 opposite to turning tool 10. A second recess 40 is provided in mounting surface 45. Each of the plurality of power transmitting coil units 211 is disposed in second recess 40.

(22) According to turning device 100 of (21), turret 22 includes second nonmetallic film 46 that is disposed in second recess 40 and covers each of the plurality of power transmitting coil units 211. Accordingly, the waterproof property of each of the plurality of power transmitting coil units 211 can be enhanced.

(23) According to turning device 100 of (22), second recess 40 includes second side wall surface 41 contiguous to mounting surface 45 and second bottom surface 42 contiguous to second side wall surface 41. Second nonmetallic film 46 includes a third surface 53 opposite to second bottom surface 42 and a fourth surface 54 located on an opposite side of third surface 53. Fourth surface 54 is located between mounting surface 45 and second bottom surface 42 in a direction along second side wall surface 41. Accordingly, second nonmetallic film 46 can be prevented from protruding from second recess 40 to ride on mounting surface 45 of turret 22. Consequently, shank 16 can be firmly attached to mounting surface 45 of turret 22.

Detailed Embodiment of the Present Disclosure

With reference to the drawings, details of embodiments of the present disclosure will be described below. In the following drawings, the same or corresponding component is designated by the same reference numeral, and the overlapping description will be omitted.
<Turning Device>

First Embodiment

A constitution of a turning device 100 according to a first embodiment will be described below. FIG. 1 is an entire constitution diagram illustrating the constitution of turning device 100 of the first embodiment.

As illustrated in FIG. 1, turning device 100 of the first embodiment includes a machine tool 20 and turning tool 10. Machine tool 20 mainly includes turret 22 and a power supply 23. Turning tool 10 mainly includes cutting insert 17, shank 16, power receiving coil 11, a rectifier circuit 19, sensor 12, a controller 13, and wireless unit 14. Turret 22 includes power transmitting coil 21. Turning tool 10 is attached to turret 22.

Power transmitting coil 21 is connected to power supply 23. Power transmitting coil 21 transmits the power to power receiving coil 11. Power receiving coil 11 receives the power from power transmitting coil 21. Power receiving coil 11 receives power transmitted from a power transmitting coil 21 in a non-contact manner. Power receiving coil 11 is constituted to receive the power from power transmitting coil 21 by, for example, electromagnetic induction. For example, power receiving coil 11 is opposite to power transmitting coil 21. For example, power receiving coil 11 is disposed coaxially with power transmitting coil 21.

Power receiving coil 11 outputs the power received from power transmitting coil 21 to rectifier circuit 19. Rectifier circuit 19 converts an alternating current received from power transmitting coil 21 into a direct current. The power converted into the direct current in rectifier circuit 19 is output to sensor 12. Sensor 12 is electrically connected to power receiving coil 11. The power converted into the direct current in rectifier circuit 19 drives sensor 12. For example, sensor 12 is a sensor 12 that detects a cutting state.

For example, sensor 12 is an acceleration sensor, a strain sensor, or a sound sensor. For example, the acceleration sensor can measure a period of vibration of turning tool 10, and amplitude of vibration. For example, the strain sensor can measure a degree of warping of shank 16. For example, the sound sensor can measure a frequency of noise generated during cutting, and amplitude of the noise.

Controller 13 is electrically connected to power receiving coil 11. The power converted into the direct current in rectifier circuit 19 is output to controller 13. The power converted into the direct current in rectifier circuit 19 drives controller 13. Controller 13 outputs the data detected by sensor 12 to wireless unit 14.

Wireless unit 14 is electrically connected to power receiving coil 11. The power converted into the direct current in rectifier circuit 19 is output to wireless unit 14. The power converted into the direct current in rectifier circuit 19 drives wireless unit 14. Wireless unit 14 transmits data detected by sensor 12 to an outside. Controller 13 controls wireless unit 14 and outputs the data detected by sensor 12 from wireless unit 14 to the outside.

Modification of First Embodiment

A constitution of turning device 100 according to a modification of the first embodiment will be described below. The constitution of turning device 100 according to the modification of the first embodiment is mainly different from the constitution of turning device 100 of the first embodiment in that each of machine tool 20 and turning tool 10 includes a resonant capacitor, and the other constitutions are similar to the constitution of turning device 100 of the first embodiment. Hereinafter, the constitution different from turning device 100 of the first embodiment will be mainly described.

Figure 2:
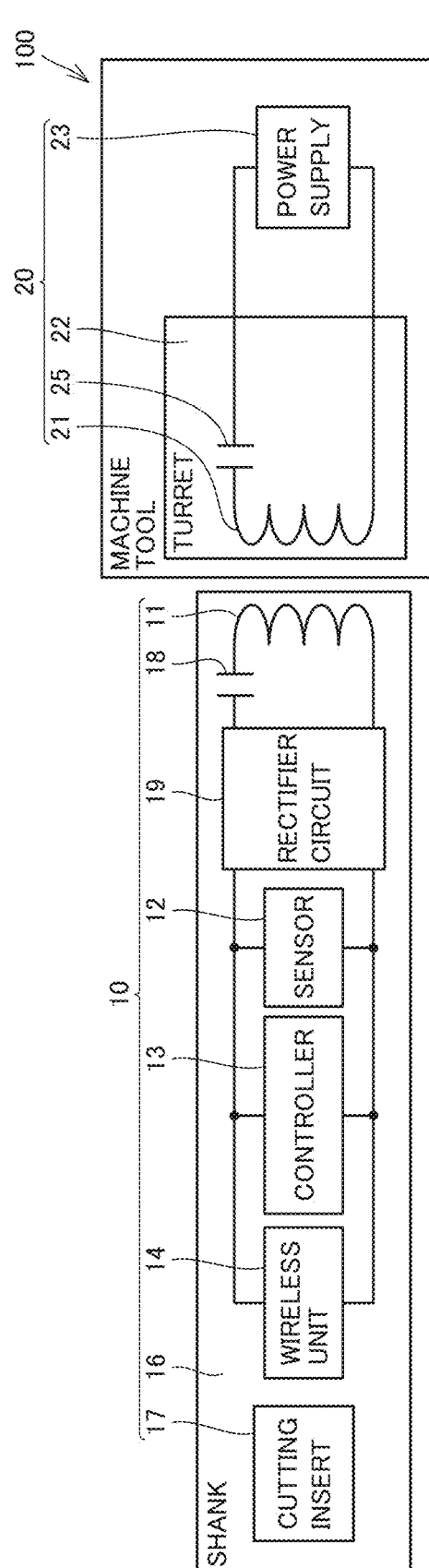
FIG. 2 is an entire constitution diagram illustrating a constitution of a turning device according to a modification of the first embodiment.

FIG. 2 is an entire constitution diagram illustrating the constitution of turning device 100 according to the modification of the first embodiment. As illustrated in FIG. 2, machine tool 20 includes a first resonant capacitor 25. First resonant capacitor 25 is connected to each of power supply 23 and power transmitting coil 21. One end of first resonant capacitor 25 is connected to power supply 23, and the other end of first resonant capacitor 25 is connected to power transmitting coil 21. First resonant capacitor 25 is connected in series to power transmitting coil 21. First resonant capacitor 25 and power transmitting coil 21 constitute a first series resonant circuit.

As illustrated in FIG. 2, turning tool 10 includes a second resonant capacitor 18. Second resonant capacitor 18 is connected to each of rectifier circuit 19 and power receiving coil 11. One end of second resonant capacitor 18 is connected to rectifier circuit 19, and the other end of second resonant capacitor 18 is connected to power receiving coil 11. Second resonant capacitor 18 is connected in series to power receiving coil 11. Second resonant capacitor 18 and power receiving coil 11 constitute a second series resonant circuit.

In turning device 100 of the modification of the first embodiment, the power is transmitted from power transmitting coil 21 to power receiving coil 11 using a magnetic resonance method. Specifically, the power is sent from power transmitting coil 21 to power receiving coil 11 by magnetically coupling power transmitting coil 21 and power receiving coil 11 by resonance of a magnetic field. Inductance or the like of each of power transmitting coil 21 and power receiving coil 11 is appropriately determined such that a Q value and a coupling degree indicating resonance strength are increased. Accordingly, power transmission efficiency can be improved.

Second Embodiment

A configuration of turning device 100 according to a second embodiment will be described below. The constitution of turning device 100 of the second embodiment is mainly different from the constitution of turning device 100 of the first embodiment in that power transmitting coil 21 is installed in the plurality of power transmitting coil units 211, and other constitutions are similar to those of turning device 100 of the first embodiment. Hereinafter, the constitution different from turning device 100 of the first embodiment will be mainly described.

Figure 3:
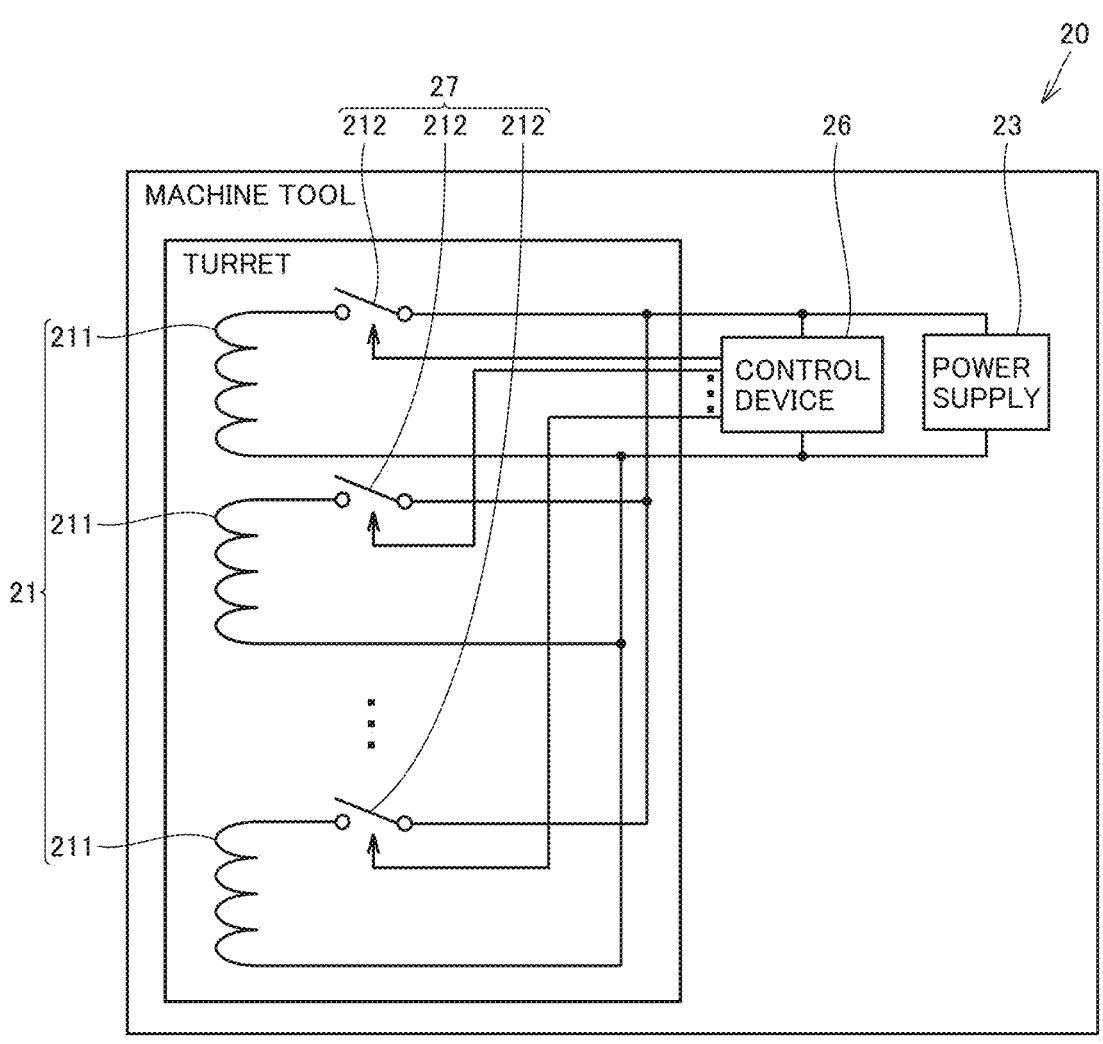
FIG. 3 is an entire constitution diagram illustrating a constitution of a turning device according to a second embodiment.

FIG. 3 is an entire constitution diagram illustrating the constitution of turning device 100 of the second embodiment. As illustrated in FIG. 3, machine tool 20 of turning device 100 of the second embodiment includes power transmitting coil 21, a switch 27, a control device 26, and power supply 23. Power transmitting coil 21 is installed in the plurality of power transmitting coil units 211. The number of power transmitting coil units 211 is not limited to three. The number of power transmitting coil units 211 may be greater than or equal to four, greater than or equal to six, greater than or equal to eight, or greater than or equal to twelve.

Switch 27 includes a plurality of switch units 212. The number of switch units 212 is not limited to three. The number of switch units 212 may be greater than or equal to four, greater than or equal to six, greater than or equal to eight, or greater than or equal to twelve. Control device 26 is electrically connected to each of the plurality of switch units 212. Control device 26 controls opening and closing of each of the plurality of switch units 212. Each of the plurality of switch units 212 may be disposed inside turret 22 or disposed outside turret 22.

As illustrated in FIG. 3, each of the plurality of power transmitting coil units 211 is disposed in turret 22. One switch unit 212 is connected in series to one power transmitting coil unit 211. Thus, the power can be selectively supplied from power supply 23 to power transmitting coil unit 211 being used among the plurality of power transmitting coil units 211. The power can be prevented from being supplied to power transmitting coil unit 211 that is not used, so that the supply of the unnecessary power can be prevented. Machine tool 20 (see FIG. 3) including the plurality of power transmitting coil units 211 may be combined with turning tool 10 (see FIG. 1 or 2) including single power receiving coil 11, or combined with turning tool 10 (see FIG. 4) including the plurality of power receiving coil units 111.

Third Embodiment

A configuration of turning device 100 according to a third embodiment will be described below. The constitution of turning device 100 of the third embodiment is mainly different from the constitution of turning device 100 of the first embodiment in that power receiving coil 11 includes the plurality of power receiving coil units 111, and other constitutions are similar to those of turning device 100 of the first embodiment. Hereinafter, the constitution different from turning device 100 of the first embodiment will be mainly described.

Figure 4:
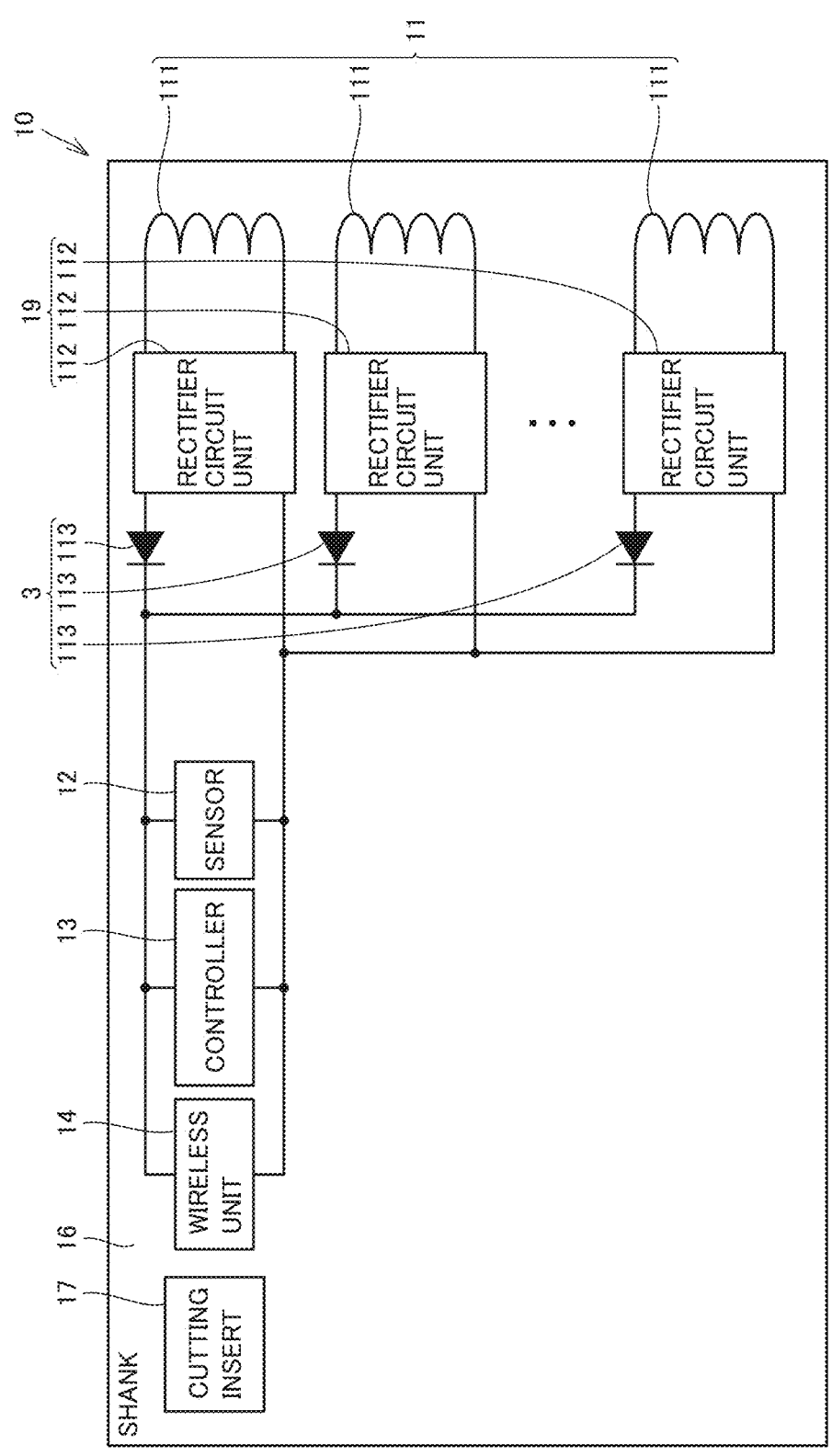
FIG. 4 is an entire constitution diagram illustrating a constitution of a turning device according to a third embodiment.

FIG. 4 is an entire constitution diagram illustrating the constitution of turning device 100 of the third embodiment. As illustrated in FIG. 4, the cutting tool of turning device 100 of the third embodiment mainly includes cutting insert 17, shank 16, power receiving coil 11, rectifier circuit 19, a diode 3, sensor 12, control 13, and wireless unit 14. Power receiving coil 11 includes the plurality of power receiving coil units 111. The number of power receiving coil units 111 is not limited to three. The number of power receiving coil units 111 may be greater than or equal to four, greater than or equal to six, greater than or equal to eight, or greater than or equal to twelve.

Rectifier circuit 19 includes a plurality of rectifier circuit units 112. The number of rectifier circuit units 112 is not limited to three. The number of rectifier circuit units 112 may be greater than or equal to six or greater than or equal to ten. Each of the plurality of rectifier circuit units 112 is connected in series to each of the plurality of power receiving coil units 111.

Diode 3 includes a plurality of diode units 113. The number of diode units 113 is not limited to three. The number of the diode units 113 may be greater than or equal to six or greater than or equal to ten. Each of the plurality of diode units 113 is connected in series with each of the plurality of rectifier circuit units 112.

As illustrated in FIG. 4, one rectifier circuit unit 112 and one diode unit 113 are connected in series to one power receiving coil unit 111. Each of the plurality of power receiving coil units 111 is connected in parallel. Turning tool 10 (see FIG. 4) including the plurality of power receiving coil units 111 may be combined with machine tool 20 (see FIG. 1 or 2) including single power transmitting coil 21, or combined with machine tool 20 (see FIG. 3) including the plurality of power transmitting coil units 211.

<Turning Tool>

First Embodiment

Figure 5:
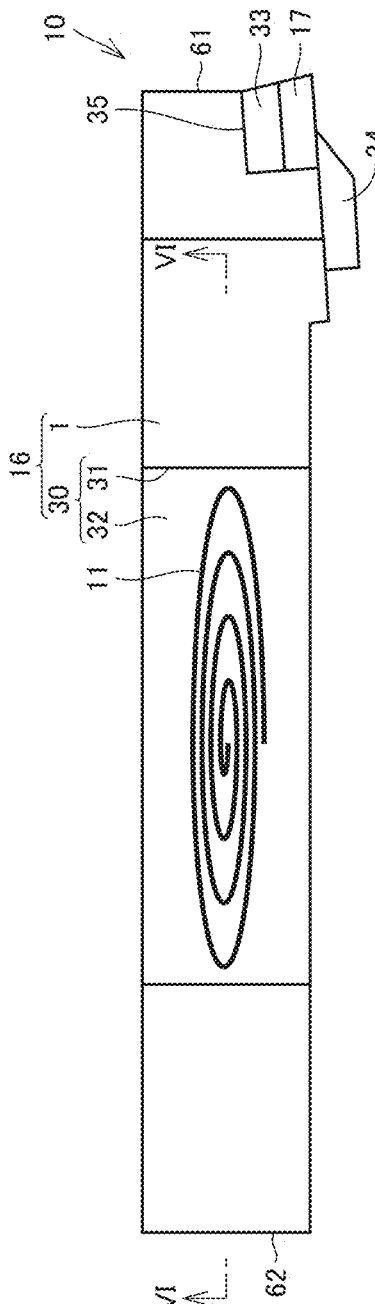
FIG. 5 is a schematic plan view illustrating a constitution of a turning tool of the first embodiment.

The constitution of turning tool 10 of the first embodiment will be described below. FIG. 5 is a schematic plan view illustrating the constitution of turning tool 10 of the first embodiment.

As illustrated in FIG. 5, turning tool 10 of the first embodiment mainly includes cutting insert 17, shank 16, power receiving coil 11, a bottom board 33, and a fixing unit 34. A mounting groove 35 is provided at a tip of shank 16. Bottom board 33 and cutting insert 17 are disposed in mounting groove 35. Bottom board 33 is disposed between cutting insert 17 and shank 16. Fixing unit 34 fixes cutting insert 17 to shank 16. Shank 16 holds cutting insert 17. Power receiving coil 11 is disposed in shank 16. Shank 16 is made of metal.

Figure 6:
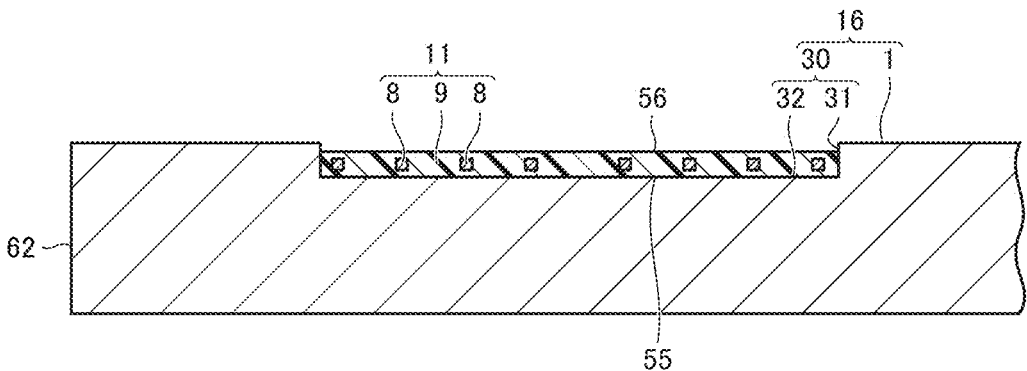
FIG. 6 is a schematic sectional view taken along a line VI-VI in FIG. 5.

FIG. 6 is a schematic sectional view taken along a line VI-VI in FIG. 5. As illustrated in FIG. 6, first recess 30 is provided on side surface 1 of shank 16. Power receiving coil 11 is disposed in first recess 30. First recess 30 includes first side wall surface 31 and first bottom surface 32. First side wall surface 31 is contiguous to side surface 1. First bottom surface 32 is contiguous to first side wall surface 31. For example, the central axis of power receiving coil 11 is perpendicular to first bottom surface 32.

For example, power receiving coil 11 includes a first conductive coil unit 8 and a first insulating coating unit 9. First conductive coil unit 8 is covered with first insulating coating unit 9. For example, power receiving coil 11 may be a flexible printed circuit (FPC). For example, the central axis of first conductive coil unit 8 is perpendicular to first bottom surface 32. From another point of view, first conductive coil unit 8 is wound around a straight line perpendicular to first bottom surface 32.

Power receiving coil 11 includes a fifth surface 55 and a sixth surface 56. Fifth surface 55 is in contact with first bottom surface 32. Sixth surface 56 is located on the opposite side of fifth surface 55. Sixth surface 56 is located between side surface 1 and first bottom surface 32 in a direction along first side wall surface 31. From another point of view, sixth surface 56 is located inside side surface 1.

Second Embodiment

The constitution of turning tool 10 of the second embodiment will be described below. The constitution of turning tool 10 of the second embodiment is mainly different from the constitution of turning tool 10 of the first embodiment in that turning tool 10 includes first nonmetallic film 38, and the other constitutions are similar to those of turning tool 10 of the first embodiment. The constitution different from turning tool 10 of the first embodiment will be mainly described below.

Figure 7:
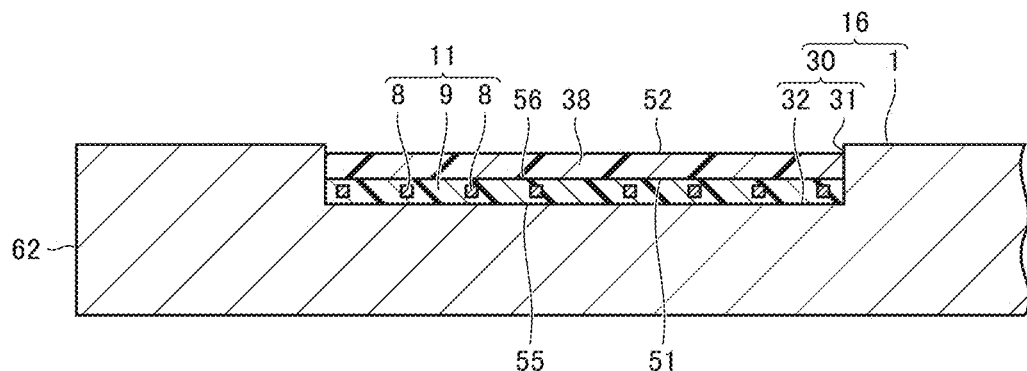
FIG. 7 is a schematic sectional view illustrating a constitution of a turning tool according to a second embodiment.

FIG. 7 is a schematic sectional view illustrating the constitution of turning tool 10 of the second embodiment. The section in FIG. 7 corresponds to the section taken along a line VI-VI in FIG. 5.

As illustrated in FIG. 7, turning tool 10 includes first nonmetallic film 38. First nonmetallic film 38 is disposed on power receiving coil 11. First nonmetallic film 38 is disposed in first recess 30. First nonmetallic film 38 covers power receiving coil 11. First nonmetallic film 38 includes first surface 51 and second surface 52. First surface 51 is opposite to first bottom surface 32. First surface 51 is in contact with sixth surface 56. Second surface 52 is located on the opposite side of first surface 51. Second surface 52 is located between side surface 1 and first bottom surface 32 in a direction along first side wall surface 31. From another point of view, second surface 52 is located inside side surface 1.

Third Embodiment

The constitution of turning tool 10 of the third embodiment will be described below. The constitution of turning tool 10 of the third embodiment is mainly different from the constitution of turning tool 10 of the second embodiment in that a width of first recess 30 is smaller than that of side surface 1 of shank 16, and the other constitutions are similar to those of turning tool 10 of the second embodiment. The constitution different from turning tool 10 of the second embodiment will be mainly described below.

Figure 8:
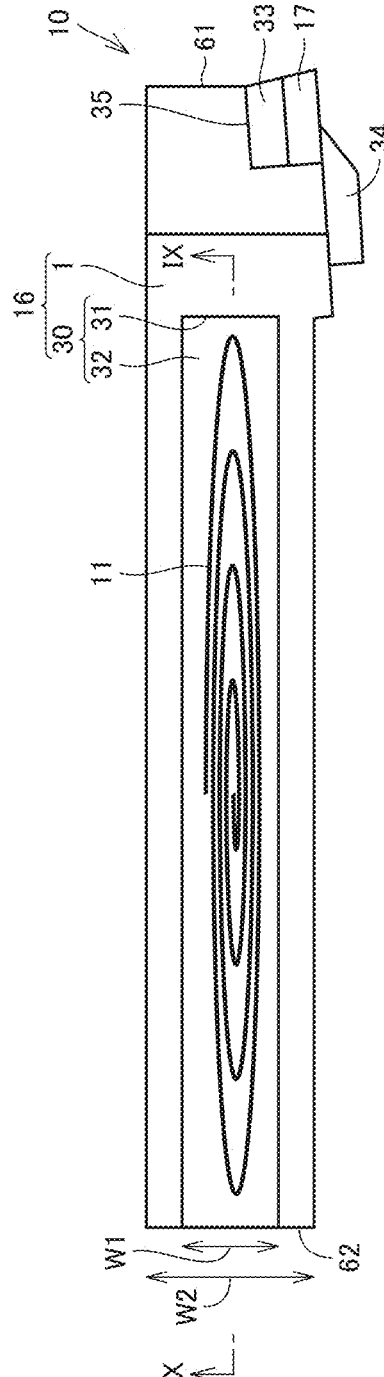
FIG. 8 is a schematic plan view illustrating a constitution of a turning tool according to a third embodiment.

FIG. 8 is a schematic plan view illustrating the constitution of turning tool 10 of the third embodiment. As illustrated in FIG. 8, first recess 30 is provided on side surface 1 of shank 16. Shank 16 includes front end face 61 and rear end face 62. Mounting groove 35 of cutting insert 17 is provided in front end face 61. Rear end face 62 is located on the opposite side of front end face 61. The direction from front end face 61 toward rear end face 62 is the longitudinal direction of shank 16. When viewed in the direction perpendicular to first bottom surface 32, the direction perpendicular to the longitudinal direction of shank 16 is a lateral direction of shank 16.

As illustrated in FIG. 8, when viewed in a direction perpendicular to first bottom surface 32, the width of first recess 30 in the longitudinal direction of shank 16 is larger than the width of first recess 30 in the lateral direction of shank 16. When viewed in a direction perpendicular to first bottom surface 32, the width (first width W1) of first recess 30 in the lateral direction of shank 16 is smaller than the width (second width W2) of shank 16 in the lateral direction of shank 16. Accordingly, rigidity of shank 16 can be increased as compared with the case where the width of first recess 30 is the same as the width of shank 16.

Figure 9:
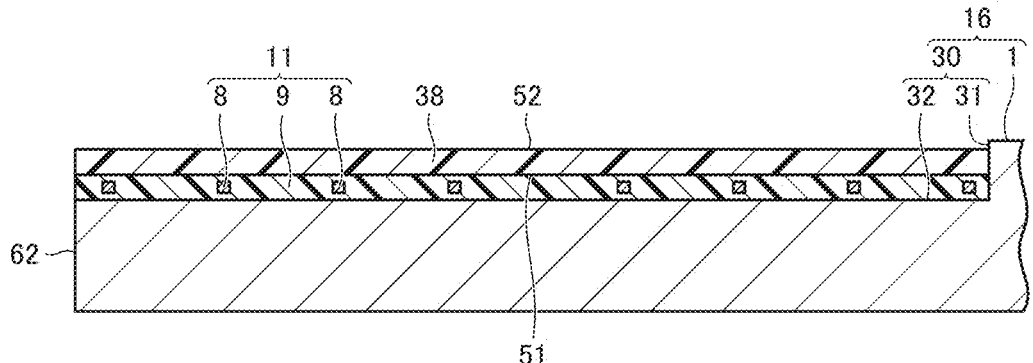
FIG. 9 is a schematic sectional view taken along a line IX-IX in FIG. 8.

FIG. 9 is a schematic sectional view taken along a line IX-IX in FIG. 8. As illustrated in FIG. 9, first nonmetallic film 38 is provided on power receiving coil 11. First recess 30 is exposed to rear end face 62. First bottom surface 32 of first recess 30 is contiguous to rear end face 62. In the longitudinal direction of shank 16, the width of first nonmetallic film 38 may be the same as the width of power receiving coil 11. In the longitudinal direction of shank 16, the width of power receiving coil 11 may be the same as the width of first bottom surface 32.

Fourth Embodiment

A constitution of turning tool 10 according to a fourth embodiment will be described below. The constitution of turning tool 10 of the fourth embodiment is mainly different from the constitutions of turning tools 10 of the first to third embodiments in that power receiving coil 11 includes first power receiving coil unit 101 and second power receiving coil unit 102, and the other constitutions are similar to the constitutions of turning tools 10 of the first to third embodiments. The constitutions different from turning tools 10 of the first to third embodiments will be mainly described below.

Figure 10:
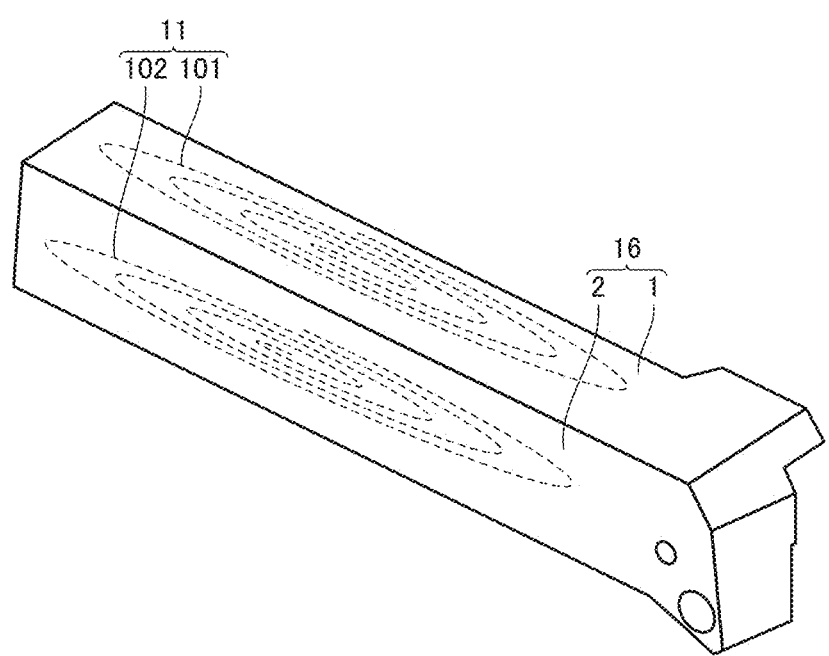
FIG. 10 is a schematic perspective view illustrating a constitution of a turning tool according to a fourth embodiment.

FIG. 10 is a schematic perspective view illustrating the constitution of turning tool 10 of the fourth embodiment. As illustrated in FIG. 10, power receiving coil 11 includes first power receiving coil unit 101 and second power receiving coil unit 102. Second power receiving coil unit 102 is separated from first power receiving coil unit 101. Shank 16 includes first side surface 1 and second side surface 2. Second side surface 2 is contiguous to first side surface 1. Second side surface 2 is inclined with respect to first side surface 1. For example, second side surface 2 is perpendicular to first side surface 1.

First power receiving coil unit 101 is provided in first side surface 1. First power receiving coil unit 101 may be exposed to first side surface 1 or disposed inside first side surface 1. Second power receiving coil unit 102 is provided in second side surface 2. Second power receiving coil unit 102 may be exposed to second side surface 2 or disposed inside second side surface 2. Each of first power receiving coil unit 101 and second power receiving coil unit 102 may be disposed in first recess 30. First nonmetallic film 38 may be disposed on each of first power receiving coil unit 101 and second power receiving coil unit 102.

Fifth Embodiment

A constitution of turning tool 10 according to a fifth embodiment will be described below. The constitution of turning tool 10 of the fifth embodiment is mainly different from the constitution of turning tool 10 of the first embodiment in that power receiving coil 11 includes the plurality of power receiving coil units 111 disposed along the longitudinal direction of shank 16, and the other constitutions are similar to those of turning tool 10 of the first embodiment. The constitution different from turning tool 10 of the first embodiment will be mainly described below.

Figure 11:
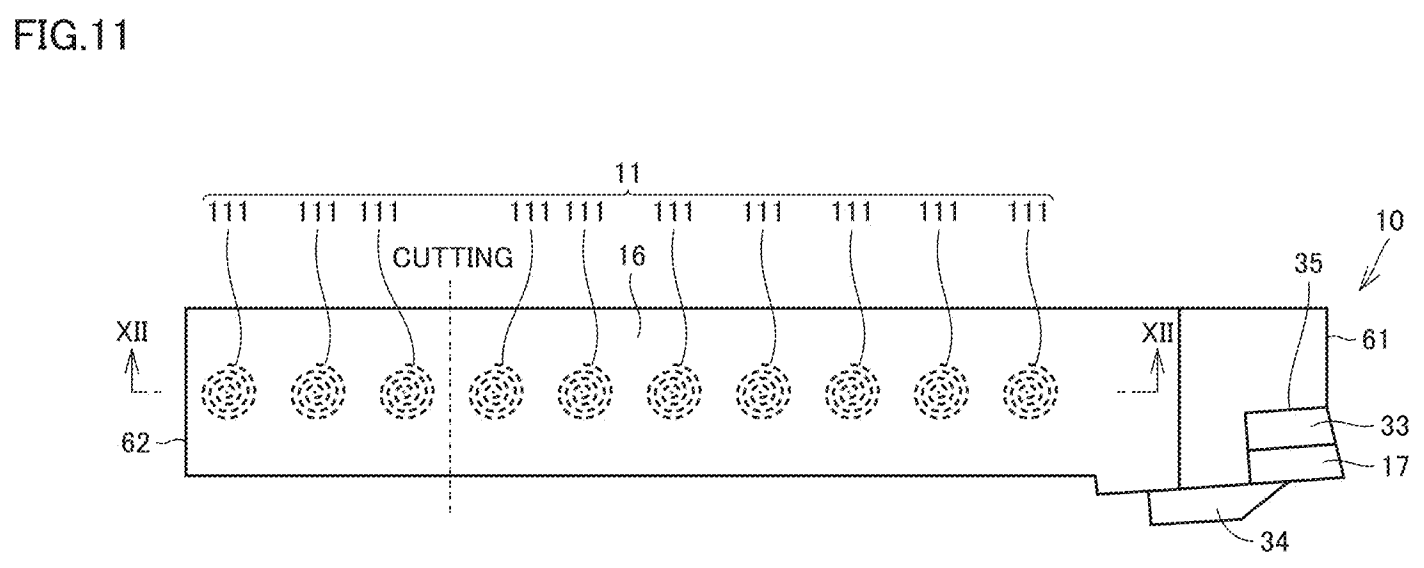

FIG. 11 is a schematic plan view illustrating the constitution of turning tool 10 of the fifth embodiment. As illustrated in FIG. 11, power receiving coil 11 includes the plurality of power receiving coil units 111. Each of the plurality of power receiving coil units 111 is disposed along the longitudinal direction of shank 16. For example, the central axis of each of the plurality of power receiving coil units 111 is a direction perpendicular to side surface 1. Shank 16 includes front end face 61 and rear end face 62. Mounting groove 35 of cutting insert 17 is provided in front end face 61. Rear end face 62 is located on the opposite side of front end face 61. The direction from front end face 61 toward rear end face 62 is the longitudinal direction of shank 16. When viewed in the direction perpendicular to side surface 1 of shank 16, the direction perpendicular to the longitudinal direction of shank 16 is the lateral direction of shank 16.

Figure 12:
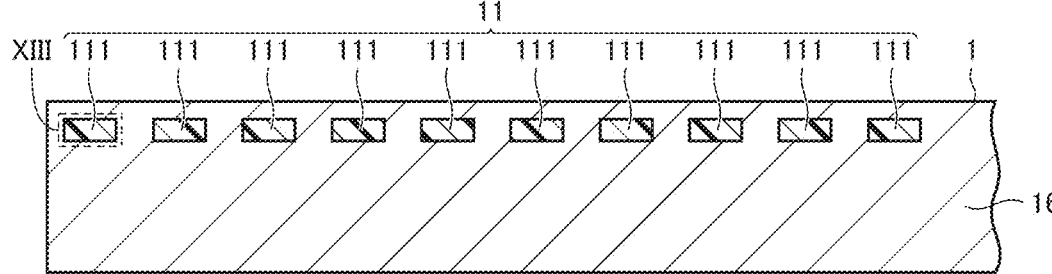
FIG. 12 is a schematic sectional view taken along a line XII-XII in FIG. 11.

FIG. 12 is a schematic sectional view taken along a line XII-XII in FIG. 11. As illustrated in FIG. 12, each of the plurality of power receiving coil units 111 is opposite to side surface 1. Each of the plurality of power receiving coil units 111 may be disposed inside shank 16 or exposed to side surface 1 of shank 16. For example, each of the plurality of power receiving coils 11 is electrically connected in parallel.

Figure 13:
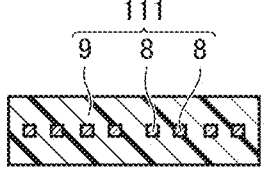
FIG. 13 is an enlarged schematic sectional view of a region XIII in FIG. 12.

FIG. 13 is an enlarged schematic sectional view of a region XIII in FIG. 12. As illustrated in FIG. 13, for example, each of the plurality of power receiving coil units 111 includes first conductive coil unit 8 and first insulating coating unit 9. First conductive coil unit 8 is covered with first insulating coating unit 9. For example, power receiving coil 11 may be a flexible printed circuit (FPC). For example, the central axis of first conductive coil unit 8 is perpendicular to side surface 1 of shank 16. From another point of view, first conductive coil unit 8 is wound around the straight line perpendicular to side surface 1 of shank 16.

Power receiving coil 11 of turning tool 10 of the fifth embodiment includes the plurality of power receiving coil units 111 disposed along the longitudinal direction of shank 16. Accordingly, even when shank 16 is cut to shorten the protrusion amount of shank 16, the power from power transmitting coil 21 can be received using remaining power receiving coil unit 111.

Sixth Embodiment

A constitution of turning tool 10 according to a sixth embodiment will be described below. The constitution of turning tool 10 of the sixth embodiment is mainly different from the constitution of turning tool 10 of the fifth embodiment in that turning tool 10 includes first nonmetallic film 38, and the other constitutions are similar to those of turning tool 10 of the fifth embodiment. The constitution different from turning tool 10 of the fifth embodiment will be mainly described below.

Figure 14:
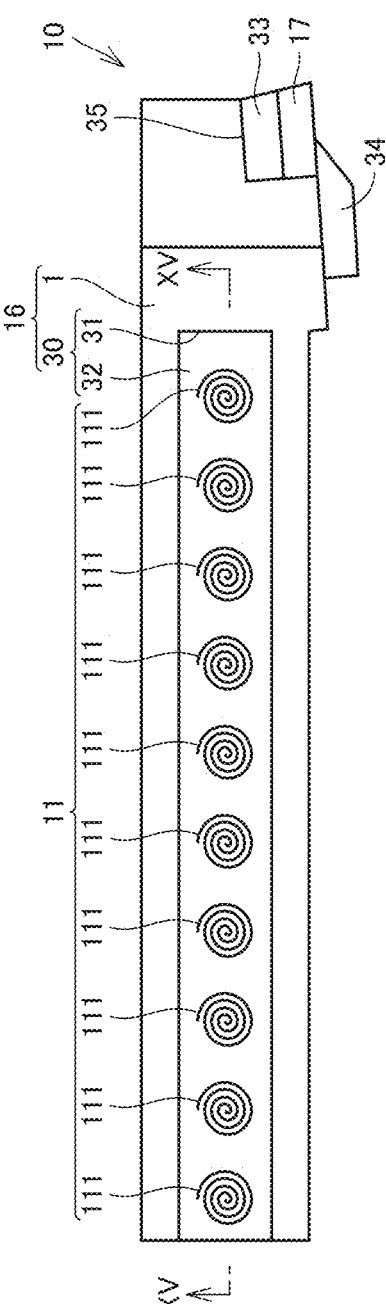
FIG. 14 is a schematic plan view illustrating a constitution of a turning tool according to a sixth embodiment.

FIG. 14 is a schematic plan view illustrating the constitution of turning tool 10 of the sixth embodiment. As illustrated in FIG. 14, power receiving coil 11 includes the plurality of power receiving coil units 111. First recess 30 is provided in side surface 1 of shank 16. The plurality of power receiving coil units 111 are disposed in first recess 30.

Figure 15:
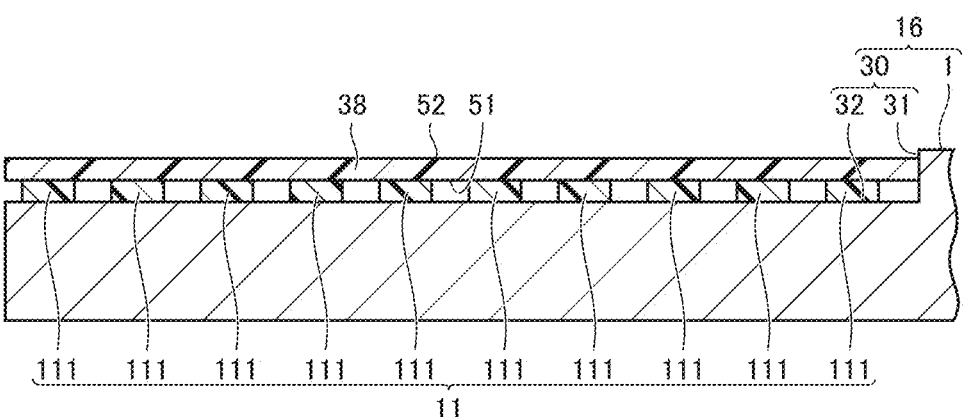
FIG. 15 is a schematic sectional view taken along a line XV-XV in FIG. 14.

FIG. 15 is a schematic sectional view taken along a line XV-XV in FIG. 14. As illustrated in FIG. 15, turning tool 10 includes first nonmetallic film 38. First nonmetallic film 38 is disposed in first recess 30. First nonmetallic film 38 covers each of the plurality of power receiving coil units 111. First recess 30 includes first side wall surface 31 and first bottom surface 32. First side wall surface 31 is contiguous to side surface 1. First bottom surface 32 is contiguous to first side wall surface 31.

First nonmetallic film 38 includes first surface 51 and second surface 52. First surface 51 is opposite to first bottom surface 32. Second surface 52 is located on the opposite side of first surface 51. Second surface 52 is located between side surface 1 and first bottom surface 32 in a direction along first side wall surface 31. Second surface 52 is located inside side surface 1 of shank 16.

For example, first nonmetallic film 38 is a translucent resin. The translucent resin may be transparent or translucent. For example, the material constituting the light-transmissive resin is acrylic or the like. When first nonmetallic film 38 is made of a translucent resin, a user of turning tool 10 can visually recognize the position of each of the plurality of power receiving coil units 111 located below first nonmetallic film 38. Consequently, when shank 16 of turning tool 10 is cut, the cutting position can be visually recognized without exposing each of power receiving coil units 111.

Seventh Embodiment

A constitution of turning tool 10 according to a seventh embodiment will be described below. The constitution of turning tool 10 of the seventh embodiment is mainly different from the constitution of turning tool 10 of the sixth embodiment in that first nonmetallic film 38 is a non-translucent resin, and the other constitutions are the same as those of turning tool 10 of the sixth embodiment. The constitution different from turning tool 10 of the sixth embodiment will be mainly described below.

Figure 16:
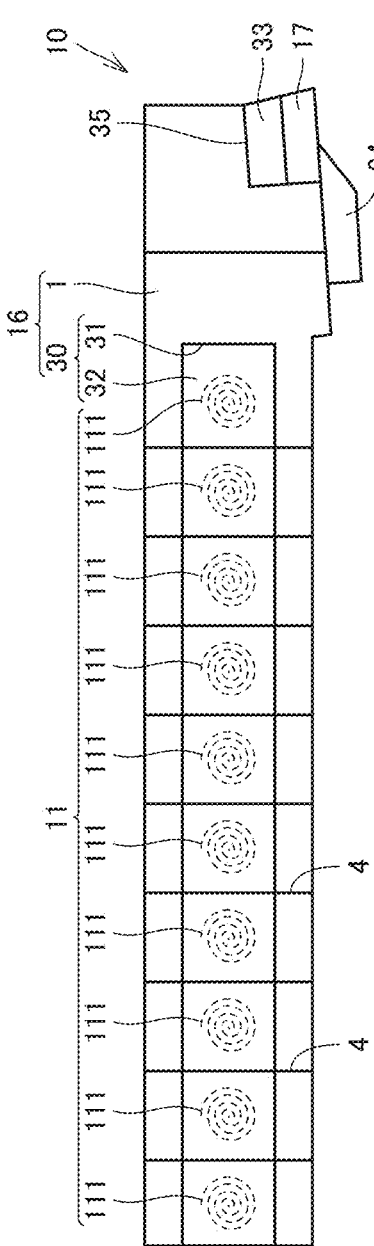
FIG. 16 is a schematic plan view illustrating a constitution of a turning tool according to a seventh embodiment.

FIG. 16 is a schematic plan view illustrating the constitution of turning tool 10 of the seventh embodiment. For example, first nonmetallic film 38 may be a non-translucent resin. For example, the material constituting the non-light-transmitting resin is polytetrafluoroethylene (PTFE). Mark 4 indicating a cutting position of shank 16 is provided on side surface 1 of shank 16. Mark 4 indicating the cutting position of shank 16 may be provided by being described on side surface 1 of shank 16 using a marker pen or the like, or provided by forming a groove on side surface 1 of shank 16.

When first nonmetallic film 38 is made of a non-translucent resin, the user of turning tool 10 cannot visually recognize the position of each of the plurality of power receiving coil units 111 located below first nonmetallic film 38. Mark 4 indicating the cutting position is provided on shank 16, the cutting position can be recognized without exposing each of power receiving coil units 111 even when first nonmetallic film 38 is a non-translucent resin.

Eighth Embodiment

A constitution of turning tool 10 according to an eighth embodiment will be described below. The constitution of turning tool 10 of the eighth embodiment is mainly different from the constitution of turning tool 10 of the sixth embodiment in that a plurality of first recesses 30 exist, and the other constitutions are similar to those of turning tool 10 of the sixth embodiment. The constitution different from turning tool 10 of the sixth embodiment will be mainly described below.

Figure 17:
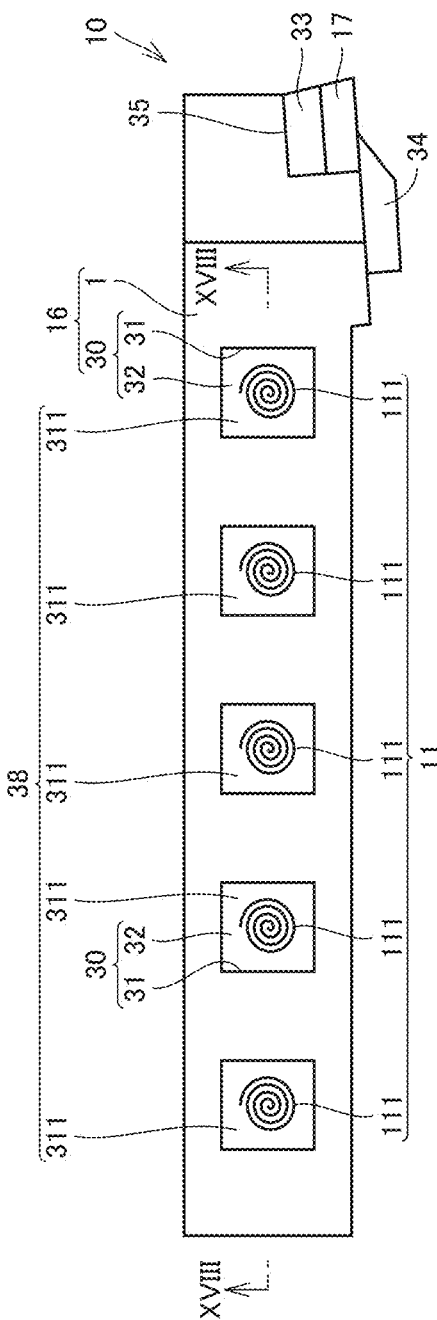
FIG. 17 is a schematic plan view illustrating a constitution of a turning tool according to an eighth embodiment.
Figure 18:
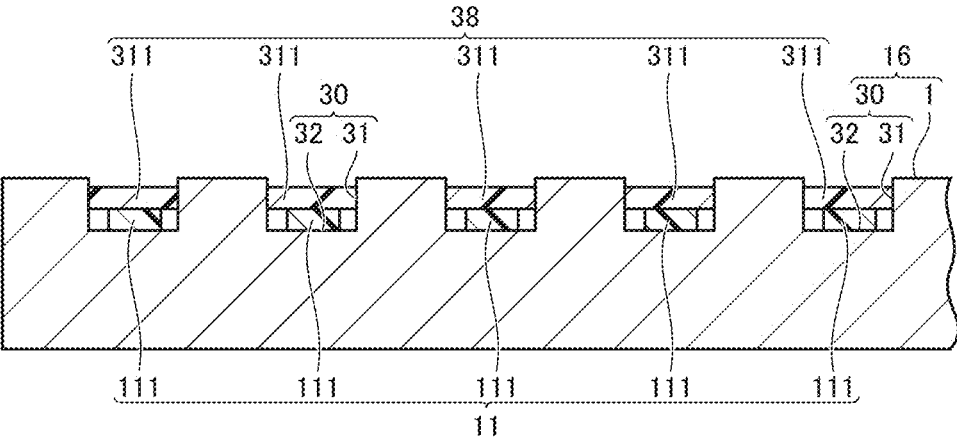
FIG. 18 is a schematic sectional view taken along a line XVIII-XVIII in FIG. 17.

FIG. 17 is a schematic plan view illustrating the constitution of turning tool 10 of the eighth embodiment. FIG. 18 is a schematic sectional view taken along a line XVIII-XVIII in FIG. 17. As illustrated in FIGS. 17 and 18, the plurality of first recesses 30 may be provided on side surface 1 of shank 16. First nonmetallic film 38 includes a plurality of first nonmetallic film units 311. Each of the plurality of first nonmetallic film units 311 is disposed in each of the plurality of first recesses 30. Each of the plurality of power receiving coil units 111 is disposed in each of the plurality of first recesses 30. In one first recess 30, one power receiving coil unit 111 and one first nonmetallic unit are disposed. In the longitudinal direction of shank 16, the width of first nonmetallic film unit 311 may be larger than the width of power receiving coil unit 111.

Ninth Embodiment

A constitution of turning tool 10 according to a ninth embodiment will be described below. The constitution of turning tool 10 of the ninth embodiment is mainly different from the constitution of turning tool 10 of the fifth embodiment in that an interval between two adjacent power receiving coil units 111 among the plurality of power receiving coil units 111 becomes shorter with increasing distance from cutting insert 17, and the other constitutions are similar to those of turning tool 10 of the fifth embodiment. The constitution different from turning tool 10 of the fifth embodiment will be mainly described below.

Figure 19:
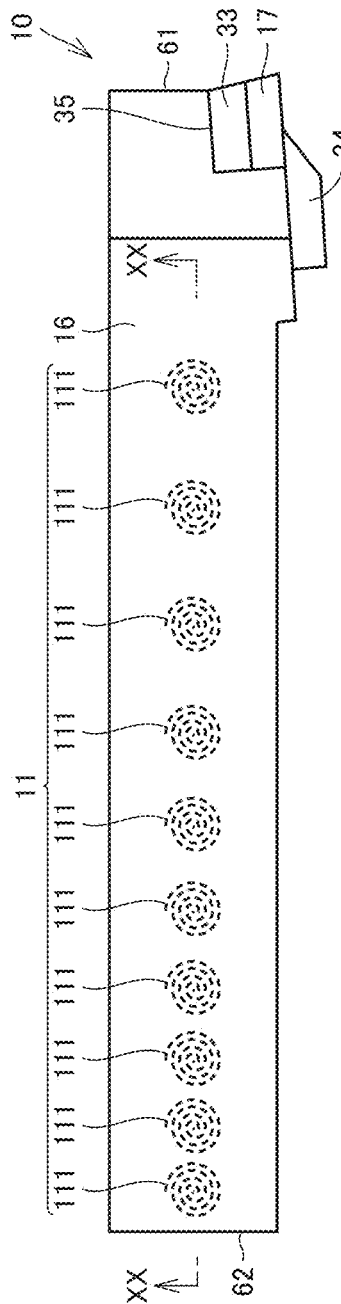
FIG. 19 is a schematic plan view illustrating a constitution of a turning tool according to a ninth embodiment.
Figure 20:
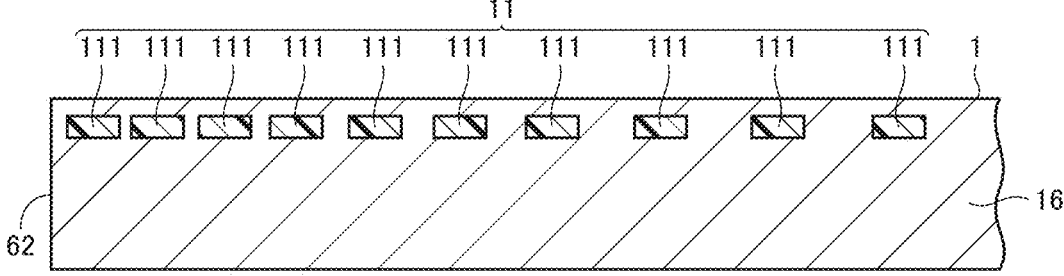
FIG. 20 is a schematic sectional view taken along a line XX-XX in FIG. 19.

FIG. 19 is a schematic plan view illustrating the constitution of turning tool 10 of the ninth embodiment. FIG. 20 is a schematic sectional view taken along a line XX-XX in FIG. 19. As illustrated in FIGS. 19 and 20, the interval between two adjacent power receiving coil units 111 among the plurality of power receiving coil units 111 becomes shorter with increasing distance from cutting insert 17. From another point of view, the interval between two adjacent power receiving coil units 111 among the plurality of power receiving coil units 111 becomes shorter from front end face 61 toward rear end face 62. Power receiving coil unit 111 is coarsely disposed on the side of front end face 61, and is densely disposed on the side of rear end face 62.

Tenth Embodiment

A constitution of turning tool 10 according to a tenth embodiment will be described below. The constitution of turning tool 10 of the tenth embodiment is mainly different from the constitution of turning tool 10 of the fifth embodiment in that the plurality of power receiving coil units 111 are alternately arranged on both sides of the straight line parallel to the longitudinal direction, and the other constitutions are similar to those of turning tool 10 of the fifth embodiment. The constitution different from turning tool 10 of the fifth embodiment will be mainly described below.

Figure 21:
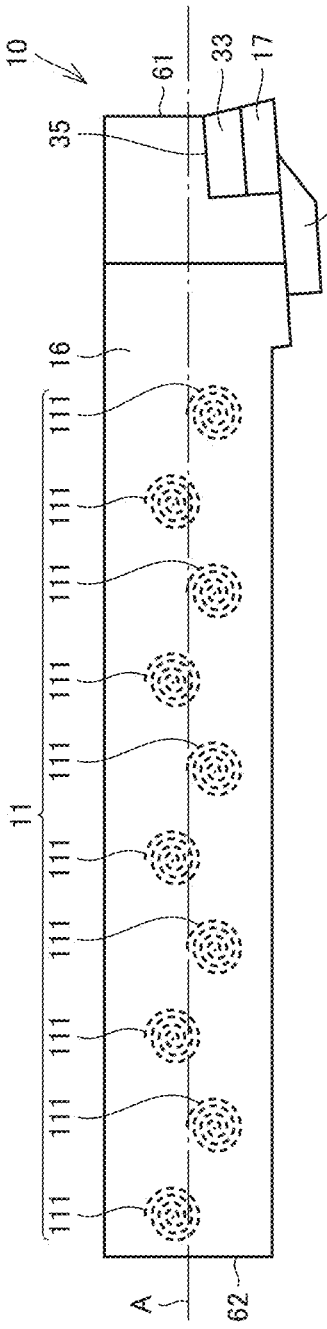
FIG. 21 is a schematic plan view illustrating a constitution of a turning tool according to a tenth embodiment.

FIG. 21 is a schematic plan view illustrating the constitution of turning tool 10 of the tenth embodiment. As illustrated in FIG. 21, the plurality of power receiving coil units 111 are alternately arranged on both sides of a straight line A parallel to the longitudinal direction of shank 16. Specifically, the centers of the plurality of power receiving coil units 111 are alternately arranged on both sides of straight line A. From another point of view, the plurality of power receiving coil units 111 are arranged in a zigzag manner. When viewed in the direction perpendicular to side surface 1, half of the plurality of power receiving coil units 111 may be disposed on one side of the straight line, and the remaining half of the plurality of power receiving coil units 111 may be disposed on the other side of the straight line.

Eleventh Embodiment

A constitution of turning tool 10 according to an eleventh embodiment will be described below. The constitution of turning tool 10 of the eleventh embodiment is mainly different from the constitution of turning tool 10 of the fifth embodiment in that each of the plurality of power receiving coil units 111 is inclined with respect to side surface 1 of shank 16, and the other constitutions are similar to those of turning tool 10 of the fifth embodiment. The constitution different from turning tool 10 of the fifth embodiment will be mainly described below.

Figure 22:
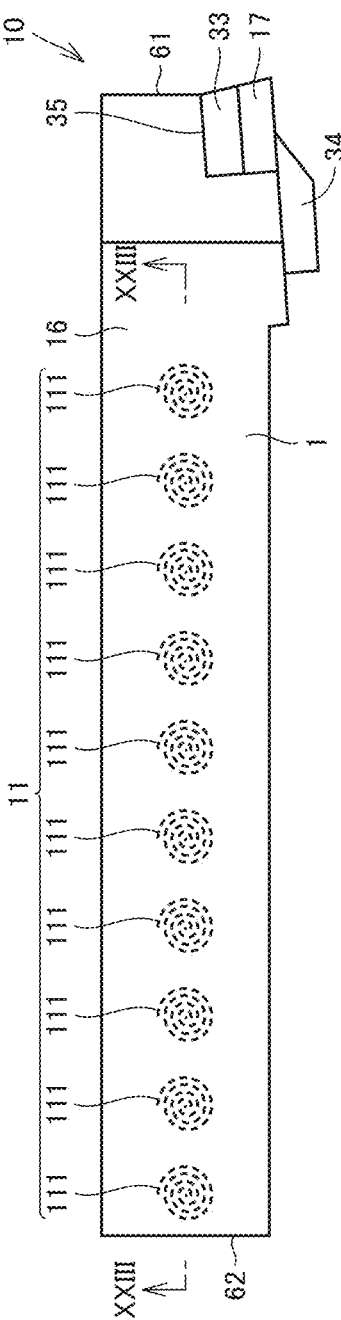
FIG. 22 is a schematic plan view illustrating a constitution of a turning tool according to an eleventh embodiment.
Figure 23:
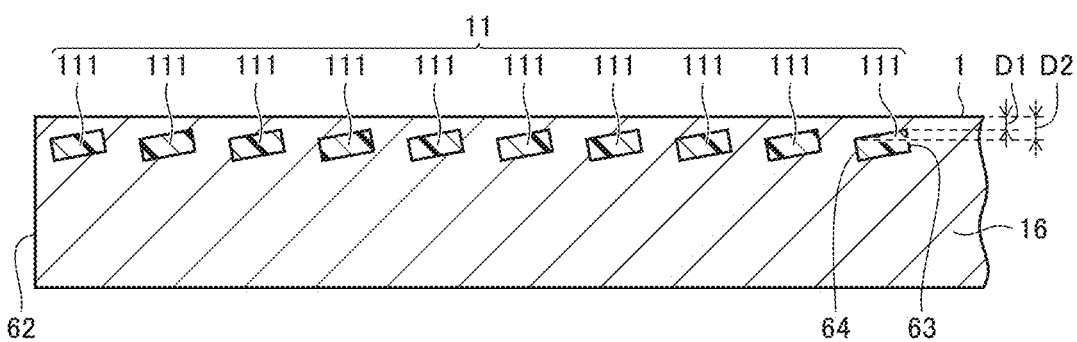
FIG. 23 is a schematic sectional view taken along a line XXIII-XXIII in FIG. 22.

FIG. 22 is a schematic plan view illustrating the constitution of turning tool 10 of the eleventh embodiment. FIG. 23 is a schematic sectional view taken along a line XXIII-XXIII in FIG. 22. As illustrated in FIGS. 22 and 23, shank 16 includes front end face 61, rear end face 62, and side surface 1. Front end face 61 is a surface to which cutting insert 17 is attached. Rear end face 62 is located on the opposite side of front end face 61. Side surface 1 is located between front end face 61 and rear end face 62.

As illustrated in FIG. 23, each of the plurality of power receiving coil units 111 includes front end 63 and rear end 64. Front end 63 is opposite to front end face 61. Rear end 64 is opposite to rear end face 62. As illustrated in FIG. 23, each of the plurality of power receiving coil units 111 is inclined with respect to side surface 1 such that the distance (first distance D1) between front end 63 and side surface 1 is smaller than the distance (second distance D2) between rear end 64 and side surface 1. When turning tool 10 is attached to mounting surface 45 of turret 22, each of the plurality of power receiving coils 11 is inclined toward rotation axis 29 of turret 22. Therefore, each of the plurality of power receiving coils 11 can efficiently receive the power from power transmitting coil 21.

<Turret>

First Embodiment

Figure 24:
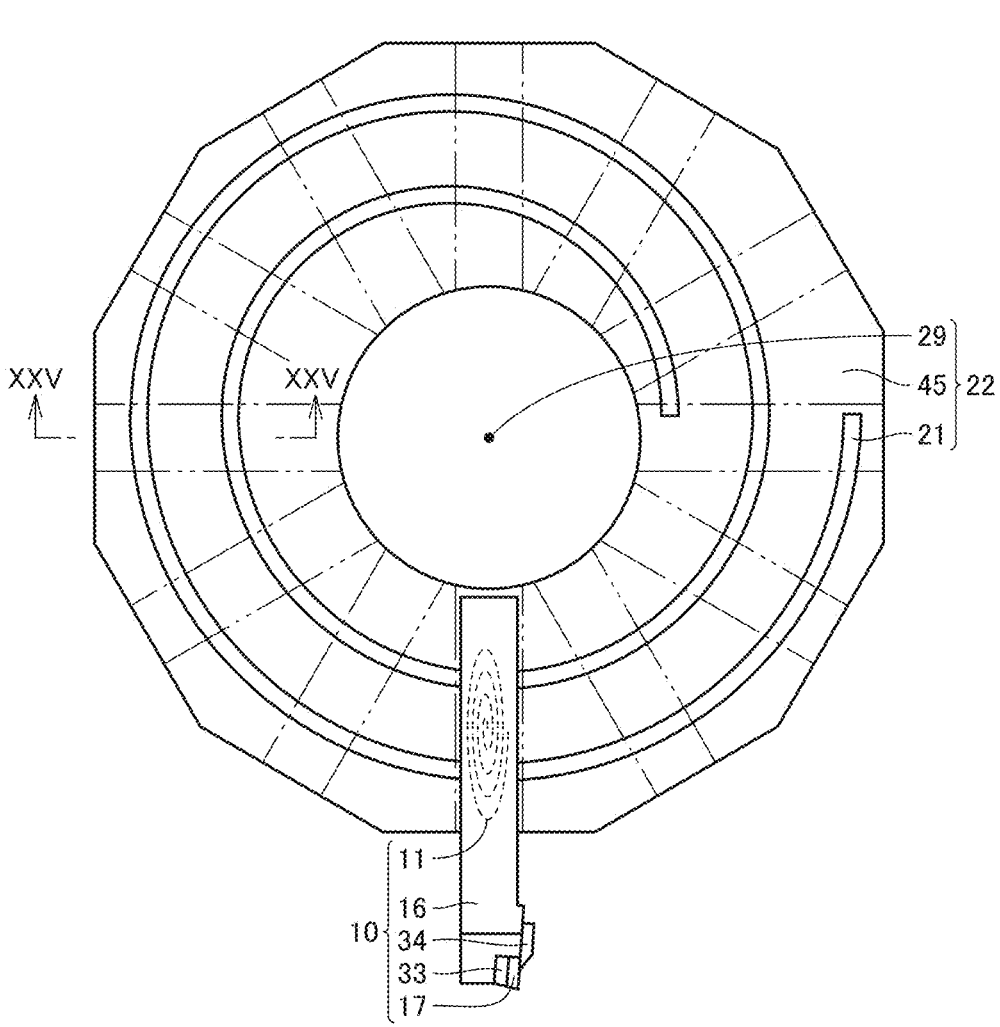
FIG. 24 is a schematic plan view illustrating a constitution of a turret of the first embodiment.

The constitution of turret 22 of the first embodiment will be described below. FIG. 24 is a schematic plan view illustrating the constitution of turret 22 of the first embodiment. As illustrated in FIG. 24, turret 22 includes mounting surface 45, rotation axis 29, and power transmitting coil 21. Turning tool 10 is attached to mounting surface 45. Mounting surface 45 is opposed to turning tool 10. Turret 22 is constituted to be rotatable around rotation axis 29. Turning tool 10 rotates about rotation axis 29 by rotating turret 22. A plurality of turning tools 10 may be attached to turret 22. By rotating turret 22, desired turning tool 10 can be disposed at a desired position among the plurality of turning tools 10.

As illustrated in FIG. 24, power transmitting coil 21 is disposed to wind around rotation axis 29 of turret 22. For example, the central axis of power transmitting coil 21 is parallel to rotation axis 29 of turret 22. For example, the central axis of power transmitting coil 21 may be matched with rotation axis 29 of turret 22. For example, the central axis of power transmitting coil 21 extends perpendicular to mounting surface 45 of turret 22. The number of turns of power transmitting coil 21 is not particularly limited, but for example, is two. The number of turns of power transmitting coil 21 may be greater than or equal to three. For example, power transmitting coil 21 is provided on mounting surface 45 of turret 22.

As illustrated in FIG. 24, when viewed in the direction perpendicular to mounting surface 45 of turret 22, power transmitting coil 21 is disposed so as to overlap with power receiving coil 11. From another point of view, power transmitting coil 21 is opposite to power receiving coil 11. The central axis of power transmitting coil 21 may be parallel to the central axis of power receiving coil 11.

Figure 25:
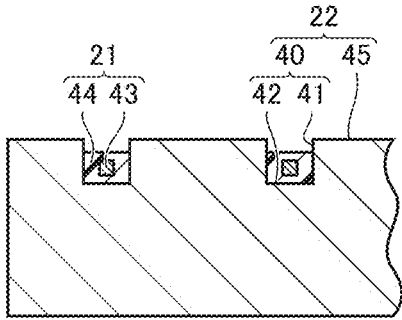
FIG. 25 is a schematic sectional view taken along a line XXV-XXV in FIG. 24.

FIG. 25 is a schematic sectional view taken along a line XXV-XXV in FIG. 24. As illustrated in FIG. 25, second recess 40 is provided in mounting surface 45 of turret 22.

Second recess 40 includes second side wall surface 41 and second bottom surface 42. Second side wall surface 41 is contiguous to mounting surface 45. Second bottom surface 42 is contiguous to second side wall surface 41. power transmitting coil 21 is disposed in second recess 40. Power transmitting coil 21 may be in contact with each of second side wall surface 41 and second bottom surface 42.

For example, power transmitting coil 21 includes second conductive coil unit 43 and second insulating coating unit 44. Second conductive coil unit 43 is covered with second insulating coating unit 44. For example, power transmitting coil 21 may be a flexible printed circuit (FPC). Second insulating coating unit 44 may be in contact with each of second side wall surface 41 and second bottom surface 42.

Second Embodiment

The constitution of turret 22 of the second embodiment will be described below. The constitution of turret 22 of the second embodiment is mainly different from the constitution of turret 22 of the first embodiment in that power transmitting coil 21 is installed in the plurality of power transmitting coil units 211, and the other constitutions are similar to those of turret 22 of the first embodiment. The constitution different from turret 22 of the first embodiment will be mainly described below.

Figure 26:
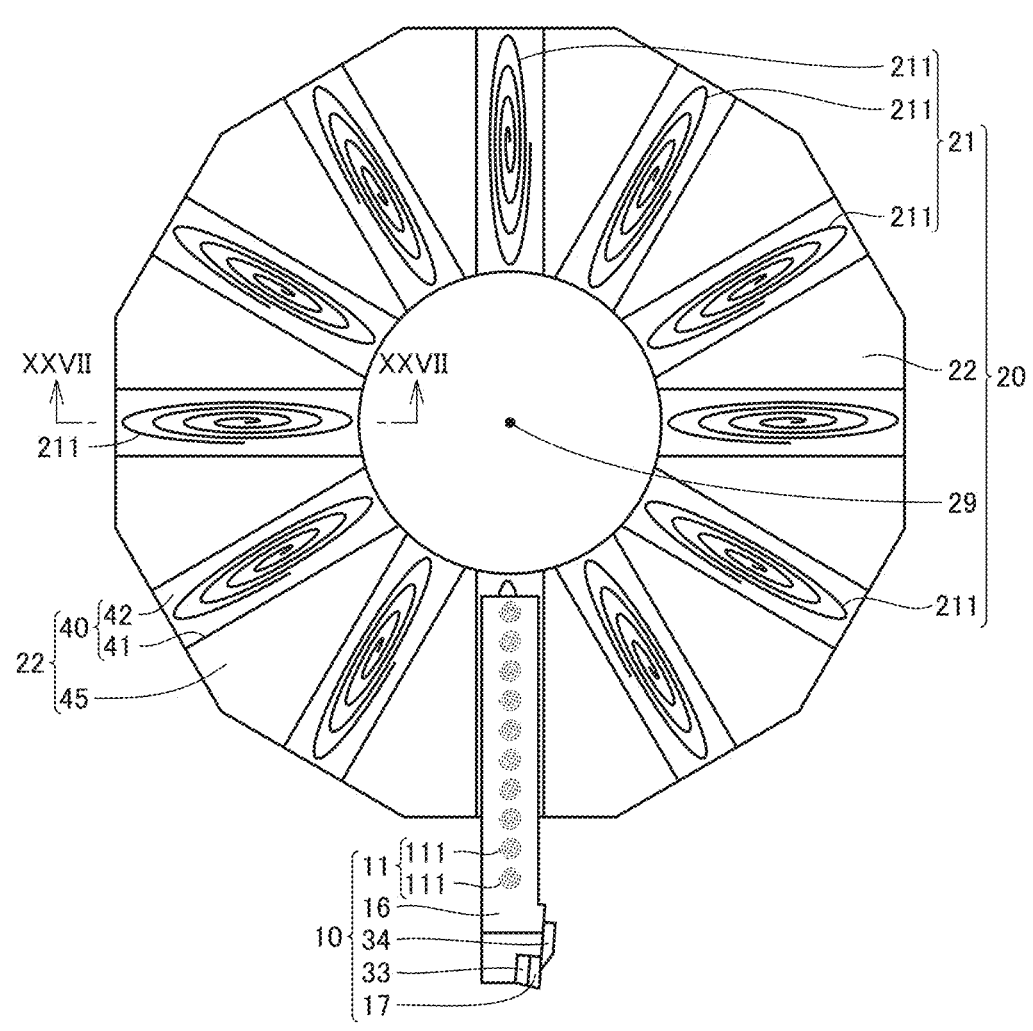
FIG. 26 is a schematic plan view illustrating a constitution of a turret of the second embodiment.
Figure 27:
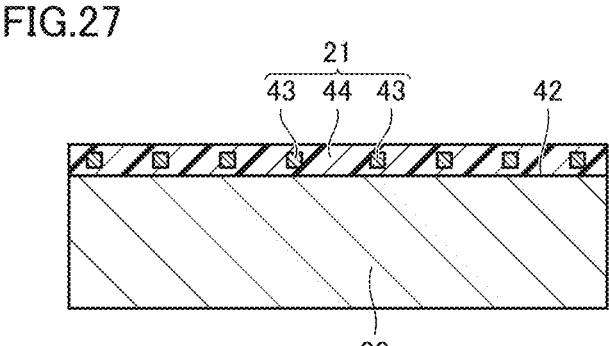
FIG. 27 is a schematic sectional view taken along a line XXVII-XXVII in FIG. 26.

FIG. 26 is a schematic plan view illustrating the constitution of turret 22 of the second embodiment. FIG. 27 is a schematic sectional view taken along a line XXVII-XXVII in FIG. 26. As illustrated in FIG. 26, power transmitting coil 21 is installed in the plurality of power transmitting coil units 211. Each of the plurality of power transmitting coil units 211 is disposed around rotation axis 29 of turret 22. The plurality of power transmitting coil units 211 may be arranged radially when viewed from rotation axis 29.

As illustrated in FIG. 26, for example, the central axis of each of the plurality of power transmitting coil units 211 is parallel to rotation axis 29 of turret 22. For example, the central axis of each of the plurality of power transmitting coil units 211 extends perpendicular to mounting surface 45 of turret 22. The number of turns of each of the plurality of power transmitting coil units 211 is not particularly limited, but for example, is two. The number of turns of power transmitting coil units 211 may be greater than or equal to three. For example, each of the plurality of power transmitting coil units 211 is provided on mounting surface 45 of turret 22. The number of power transmitting coil units 211 is not particularly limited, but for example, is twelve.

As illustrated in FIG. 26, when viewed in the direction perpendicular to mounting surface 45 of turret 22, power transmitting coil unit 211 is disposed so as to overlap with power receiving coil unit 111. From another point of view, power transmitting coil unit 211 is opposite to power receiving coil unit 111. The central axis of power transmitting coil unit 211 may be parallel to the central axis of power receiving coil unit 111.

As illustrated in FIGS. 26 and 27, a plurality of second recesses 40 may be provided in mounting surface 45 of turret 22. Each of the plurality of power transmitting coil units 211 may be provided in each of the plurality of second recesses 40. The plurality of second recesses 40 may be radially arranged when viewed from rotation axis 29. Each of the plurality of power transmitting coil units 211 may be disposed on second bottom surface 42 of second recess 40.

Third Embodiment

The constitution of turret 22 of the third embodiment will be described below. The constitution of turret 22 of the third embodiment is mainly different from the constitution of turret 22 of the first embodiment in that turret 22 includes second nonmetallic film 46, and the other constitutions are similar to those of turret 22 of the first embodiment. The constitution different from turret 22 of the first embodiment will be mainly described below.

Figure 28:
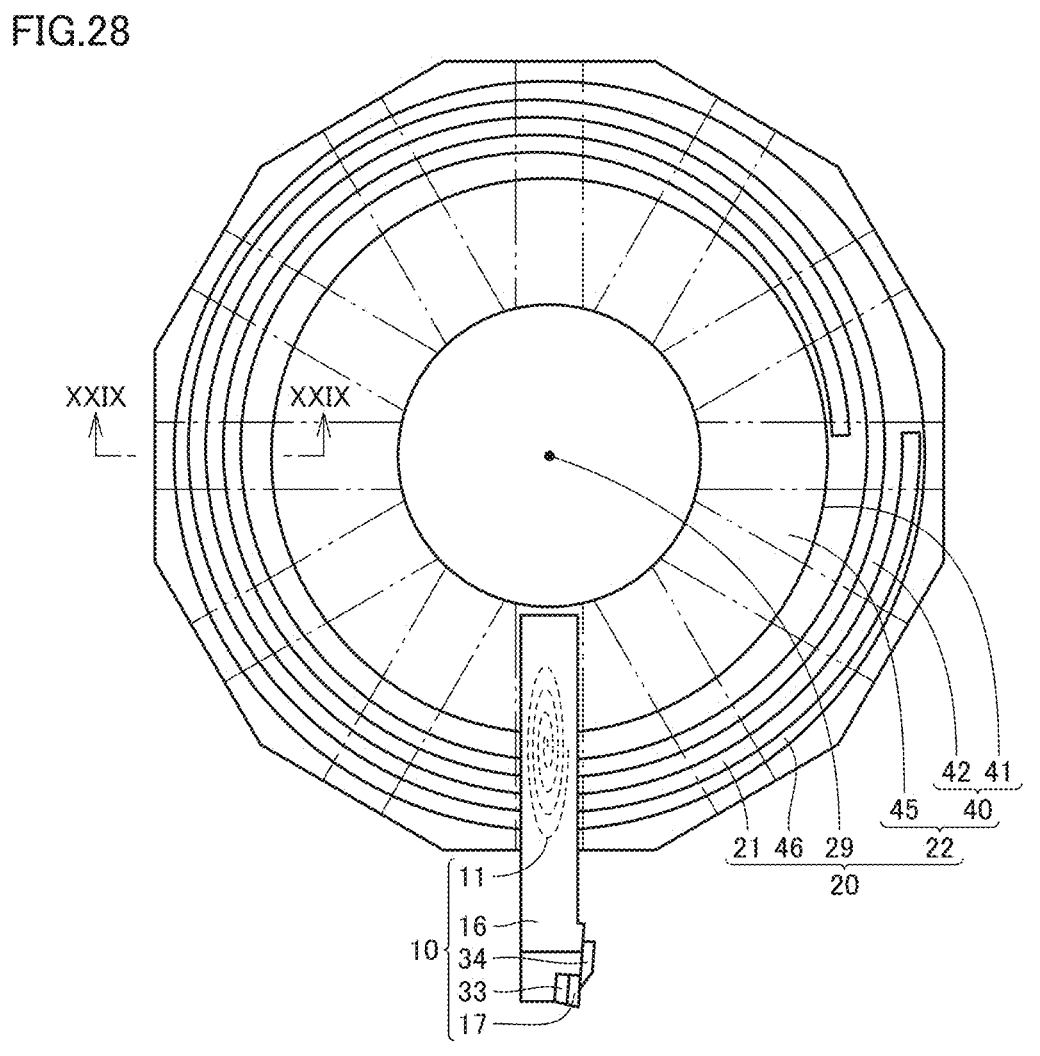
Figure 29:
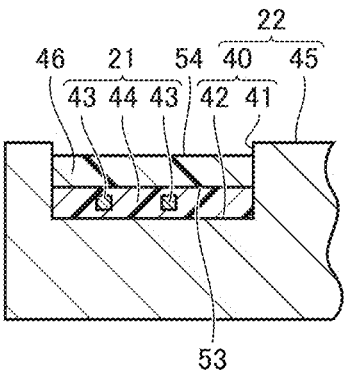
FIG. 29 is a schematic sectional view taken along a line XXIX-XXIX in FIGS. 28 and 30.

FIG. 28 is a schematic plan view illustrating the constitution of turret 22 of the third embodiment. FIG. 29 is a schematic sectional view taken along a line XXIX-XXIX in FIGS. 28 and 30. As illustrated in FIGS. 28 and 29, turret 22 includes second nonmetallic film 46. Second nonmetallic film 46 is disposed in second recess 40. Second nonmetallic film 46 covers power transmitting coil 21. Second nonmetallic film 46 is in contact with power transmitting coil 21. Second recess 40 surrounds rotation axis 29 of turret 22. Second nonmetallic film 46 surrounds rotation axis 29 of turret 22.

Second nonmetallic film 46 includes third surface 53 and fourth surface 54. Third surface 53 is opposite to second bottom surface 42 of second recess 40. Third surface 53 is in contact with power transmitting coil 21. Fourth surface 54 is located on the opposite side of third surface 53. Fourth surface 54 is located between mounting surface 45 and second bottom surface 42 in a direction along second side wall surface 41. Fourth surface 54 is located inside mounting surface 45.

Fourth Embodiment

The constitution of turret 22 of the fourth embodiment will be described below. The constitution of turret 22 of the fourth embodiment is mainly different from the constitution of turret 22 of the third embodiment in that second recesses 40 are radially formed, and the other constitutions are similar to those of turret 22 of the third embodiment. The constitution different from turret 22 of the third embodiment will be mainly described below.

Figure 30:
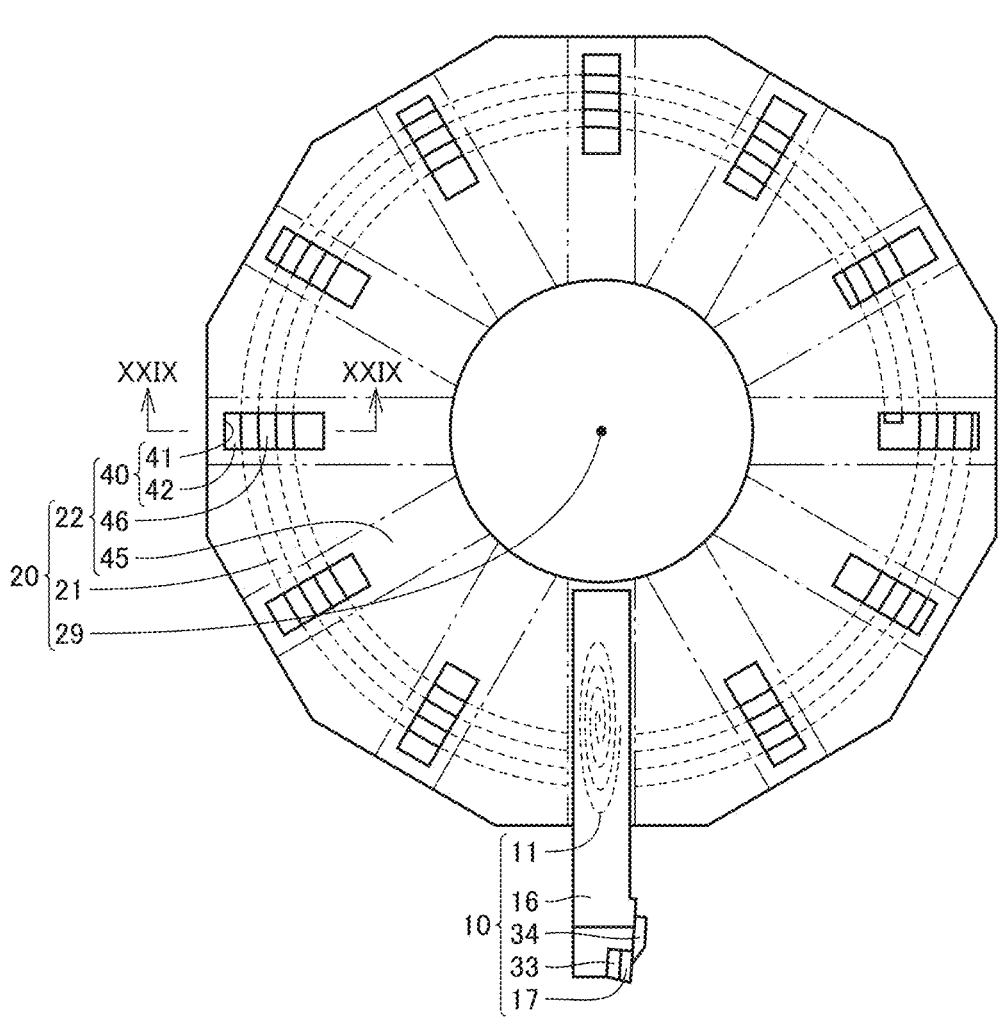
FIG. 30 is a schematic plan view illustrating a constitution of a turret of the fourth embodiment.

FIG. 30 is a schematic plan view illustrating the constitution of turret 22 of the fourth embodiment. As illustrated in FIGS. 29 and 30, the plurality of second recesses 40 is formed radially when viewed from rotation axis 29 of turret 22. Each of the plurality of second recesses 40 extends in the radial direction of turret 22. When viewed in the direction parallel to rotation axis 29 of turret 22, for example, the shape of each of the plurality of second recesses 40 is a rectangle.

Each of the plurality of second nonmetallic films 46 is disposed in each of the plurality of second recesses 40. Each of the plurality of second nonmetallic films 46 covers power transmitting coil 21. The plurality of second nonmetallic films 46 are formed radially when viewed from rotation axis 29 of turret 22. The plurality of second nonmetallic films 46 are formed radially when viewed from rotation axis 29 of turret 22. The plurality of second nonmetallic films 46 extend in the radial direction of turret 22. When viewed in the direction parallel to rotation axis 29 of turret 22, for example, the shape of each of the plurality of second nonmetallic films 46 is a rectangle.

Fifth Embodiment

The constitution of turret 22 of the fifth embodiment will be described below. The constitution of turret 22 of the fifth embodiment is mainly different from the constitution of the turret 22 of the second embodiment in that the width of second recess 40 is smaller than the width of side surface 1 of shank 16, and the other constitutions are similar to those of turret 22 of the second embodiment. The constitution different from turret 22 of the second embodiment will be mainly described below.

Figure 31:
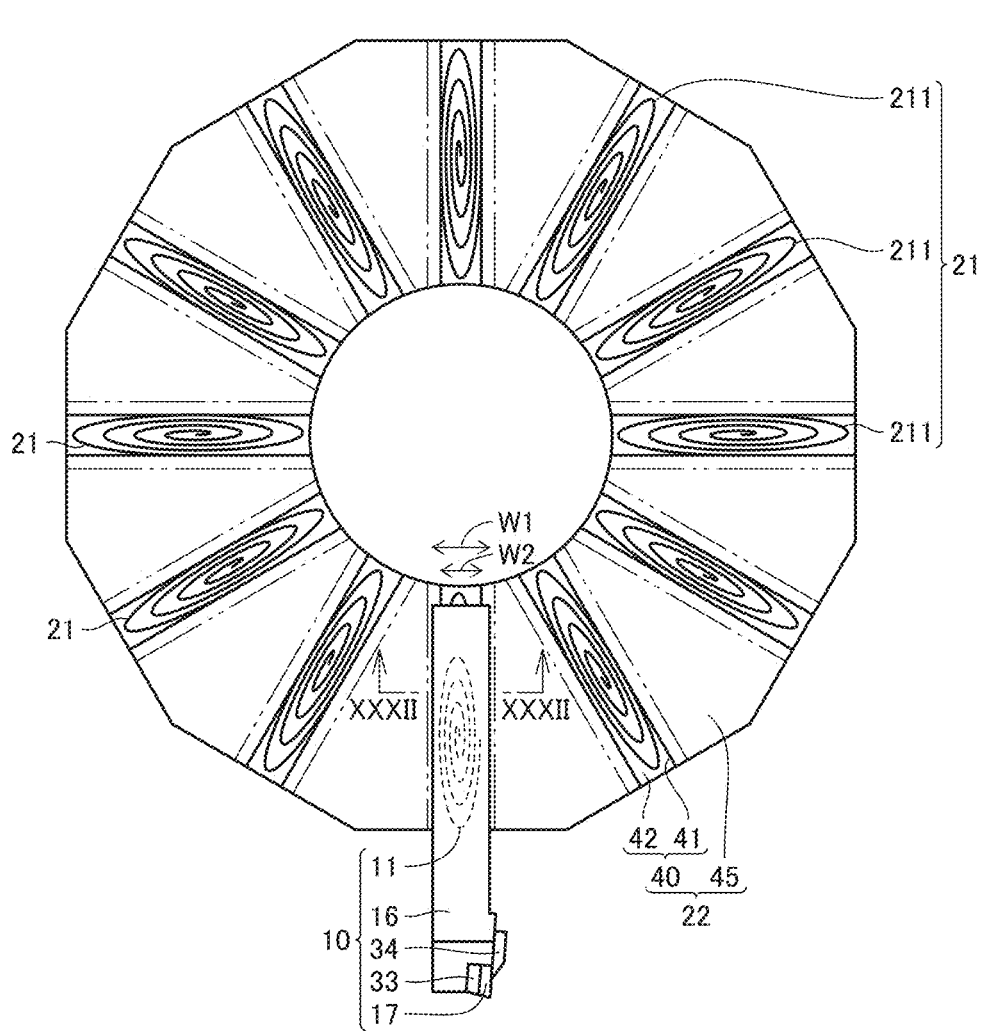
FIG. 31 is a schematic plan view illustrating a constitution of a turret of the fifth embodiment.
Figure 32:
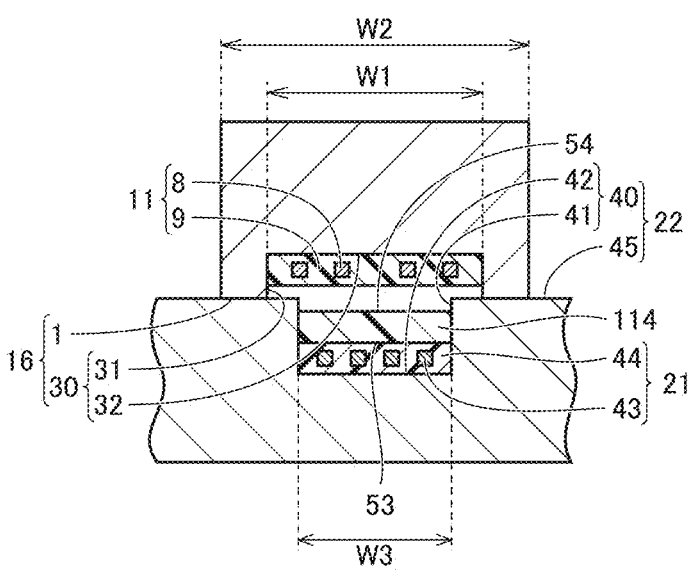
FIG. 32 is a schematic sectional view taken along a line XXXII-XXXII in FIG. 31.

FIG. 31 is a schematic plan view illustrating the constitution of turret 22 of the fifth embodiment. FIG. 32 is a schematic sectional view taken along a line XXXII-XXXII in FIG. 31. As illustrated in FIGS. 31 and 32, each of the plurality of power transmitting coil units 211 is disposed around rotation axis 29 of turret 22. Turret 22 includes mounting surface 45 opposite to turning tool 10. The plurality of second recesses 40 are provided in mounting surface 45. Each of the plurality of power transmitting coil units 211 is disposed in each of the plurality of second recesses 40. Second nonmetallic film 46 includes the plurality of second nonmetallic film units 114. Each of the plurality of second nonmetallic film units 114 is disposed in each of the plurality of second recesses 40. Each of the plurality of second nonmetallic film units 114 covers each of the plurality of power transmitting coil units 211.

Each of the plurality of second recesses 40 includes second side wall surface 41 and second bottom surface 42. Second side wall surface 41 is contiguous to mounting surface 45. Second bottom surface 42 is contiguous to second side wall surface 41. Each of the plurality of second nonmetallic film units 114 includes third surface 53 and fourth surface 54. Third surface 53 is opposite to second bottom surface 42. Fourth surface 54 is located on the opposite side of third surface 53. Fourth surface 54 is located between mounting surface 45 and second bottom surface 42 in a direction along second side wall surface 41.

The section in FIG. 32 is a section perpendicular to the radial direction of turret 22. As illustrated in FIG. 32, in the section perpendicular to the radial direction of turret 22, the width (third width W3) of second recess 40 may be smaller than the width (second width W2) of side surface 1 of shank 16. In the section perpendicular to radial direction of turret 22, the width (third width W3) of second recess 40 may be smaller than the width (first width W1) of first recess 30. In the section perpendicular to the radial direction of turret 22, the width of power receiving coil unit 111 may be larger than the width of power transmitting coil unit 211.

<Combination of Turning Tool and Turret>

Turning tool 10 of any one of the first to fourth embodiments can be combined with turret 22 of any one of the first to fifth embodiments. Turning tool 10 of any one of the fifth to eleventh embodiments can be combined with turret 22 of the second or fifth embodiment. Turning tool 10 of any one of the fifth to eleventh embodiments may be combined with turret 22 of any one of the first, third, and fourth embodiments.

Advantageous Effect

Advantageous effects of turning tool 10 and turning device 100 of the present disclosure will be described below.

According to turning tool 10 of the present disclosure, power receiving coil 11 receives power transmitted from power transmitting coil 21 in a non-contact manner. Sensor 12 is electrically connected to power receiving coil 11. Wireless unit 14 transmits data detected by sensor 12 to an outside. Thus, the power can be supplied to sensor 12 in a non-contact manner. Accordingly, the hindrance of the rotation of a turret 22 can be prevented while the high water-proofness is secured.

Turning tool 10 of the present disclosure further includes cutting insert 17 and shank 16 that holds cutting insert 17.

Power receiving coil 11 is disposed in shank 16. Thus, an area of power receiving coil 11 can be increased.

According to turning tool 10 of the present disclosure, first recess 30 is provided on side surface 1 of shank 16. Power receiving coil 11 is disposed in first recess 30. Consequently, side surface 1 of shank 16 can be pressed against turret 22 while power receiving coil 11 does not come into contact with turret 22. As a result, turning tool 10 can be firmly attached to turret 22.

Turning tool 10 of the present disclosure further includes first nonmetallic film 38 that is disposed in first recess 30 and covers power receiving coil 11. Accordingly, the waterproof property of power receiving coil 11 can be enhanced.

According to turning tool 10 of the present disclosure, first recess 30 includes first side wall surface 31 contiguous to side surface 1 and first bottom surface 32 contiguous to first side wall surface 31. First nonmetallic film 38 includes a first surface 51 opposite to first bottom surface 32 and a second surface 52 on an opposite side of first surface 51. Second surface 52 is located between side surface 1 and first bottom surface 32 in a direction along first side wall surface 31. Accordingly, first nonmetallic film 38 can be prevented from protruding from first recess 30 to ride on side surface 1 of shank 16. Consequently, side surface 1 of shank 16 can be firmly attached to turret 22.

According to turning tool 10 of the present disclosure, power receiving coil 11 includes first power receiving coil unit 101 and second power receiving coil unit 102 separated from first power receiving coil unit 101. Shank 16 includes a first side surface 1 and a second side surface 2 that is contiguous to first side surface 1 and is inclined with respect to first side surface 1. First power receiving coil unit 101 is provided in first side surface 1. Second power receiving coil unit 102 is provided in second side surface 2. Accordingly, the power can be efficiently received from turret 22 regardless of the surface attached to turret 22.

According to turning tool 10 of the present disclosure, power receiving coil 11 includes a plurality of power receiving coil units 111 disposed along a longitudinal direction of shank 16. Accordingly, even when shank 16 is cut to shorten a protrusion amount of shank 16, the power can be received from turret 22.

According to turning tool 10 of the present disclosure, first recess 30 in which each of the plurality of power receiving coil units 111 is disposed is provided in side surface 1 of shank 16. Turning tool 10 includes first nonmetallic film 38 that is disposed in first recess 30 and covers each of the plurality of power receiving coil units 111. Accordingly, the waterproof property of each of the plurality of power receiving coil units 111 can be enhanced.

According to turning tool 10 of the present disclosure, first recess 30 includes first side wall surface 31 contiguous to side surface 1 and first bottom surface 32 contiguous to first side wall surface 31. First nonmetallic film 38 includes a first surface 51 opposite to first bottom surface 32 and a second surface 52 on an opposite side of first surface 51. Second surface 52 is located between side surface 1 and first bottom surface 32 in a direction along first side wall surface 31. Accordingly, first nonmetallic film 38 can be prevented from protruding from first recess 30 to ride on side surface 1 of shank 16. Consequently, side surface 1 of shank 16 can be firmly attached to turret 22.

According to turning tool 10 of the present disclosure, first nonmetallic film 38 is a translucent resin. When first nonmetallic film 38 is made of a translucent resin, a user of turning tool 10 can visually recognize the position of each of the plurality of power receiving coil units 111 located below first nonmetallic film 38. Consequently, when shank 16 of turning tool 10 is cut, the cutting position can be visually recognized without exposing each of power receiving coil units 111.

According to turning tool 10 of the present disclosure, first nonmetallic film 38 is a non-translucent resin. A mark 4 indicating a cutting position of shank 16 is provided on shank 16. When first nonmetallic film 38 is made of a non-translucent resin, the user of turning tool 10 cannot visually recognize the position of each of the plurality of power receiving coil units 111 located below first nonmetallic film 38. Mark 4 indicating the cutting position is provided on shank 16, the cutting position can be recognized without exposing each of power receiving coil units 111 even when first nonmetallic film 38 is a non-translucent resin.

According to turning tool 10 of the present disclosure, an interval between two adjacent power receiving coil units 111 among the plurality of power receiving coil units 111 becomes shorter with increasing distance from cutting insert 17. Accordingly, even when shank 16 is cut to shorten the protruding amount of shank 16, the decrease in the power from turret 22 can be prevented.

According to turning tool 10 of the present disclosure, the plurality of power receiving coil units 111 are alternately arranged on both sides of a straight line parallel to the longitudinal direction. Accordingly, when turning tool 10 is attached to turret 22, the power can be received from turret 22 even when the position of shank 16 is shifted from the center of power transmitting coil 21.

According to turning tool 10 of the present disclosure, shank 16 includes front end face 61 to which cutting insert 17 is attached, rear end face 62 located on an opposite side of front end face 61, and side surface 1 located between front end face 61 and rear end face 62. Each of the plurality of power receiving coil units 111 includes a front end 63 opposite to the front end face 61 and a rear end 64 opposite to rear end face 62. Each of the plurality of power receiving coil units 111 is inclined with respect to side surface 1 such that a distance between front end 63 and side surface 1 is smaller than a distance between rear end 64 and side surface 1. Thus, when turning tool 10 is attached to turret 22, the surface of power receiving coil 11 is inclined in a central axis direction of turret 22. Consequently, even power receiving coil unit 111 disposed to protrude from turret 22 can receive the power from turret 22.

According to turning device 100 of the present disclosure, turret 22 includes power transmitting coil 21 that transmits power to power receiving coil 11. Thus, the power can be supplied from turret 22 to turning tool 10.

According to turning device 100 of the present disclosure, power transmitting coil 21 is disposed so as to wind around rotation axis 29 of turret 22. Thus, even when turning tool 10 is attached to any position in the circumferential direction of a mounting surface 45, the power can be supplied from power transmitting coil 21 to power receiving coil 11.

According to turning device 100 of the present disclosure, turret 22 includes mounting surface 45 opposite to turning tool 10. A second recess 40 is provided in mounting surface 45. power transmitting coil 21 is disposed in second recess 40. Consequently, shank 16 can be pressed against mounting surface 45 of turret 22 while power transmitting coil 21 does not come into contact with turning tool 10. As a result, turning tool 10 can be firmly attached to turret 22.

According to turning device 100 of the present disclosure, turret 22 includes second nonmetallic film 46 that is disposed in second recess 40 and covers power transmitting coil 21. Accordingly, the waterproof property of power transmitting coil 21 can be enhanced.

According to turning device 100 of the present disclosure, second recess 40 includes second side wall surface 41 contiguous to mounting surface 45 and second bottom surface 42 contiguous to second side wall surface 41. Second nonmetallic film 46 includes a third surface 53 opposite to second bottom surface 42 and a fourth surface 54 located on an opposite side of third surface 53. Fourth surface 54 is located between mounting surface 45 and second bottom surface 42 in a direction along second side wall surface 41. Accordingly, second nonmetallic film 46 can be prevented from protruding from second recess 40 to ride on mounting surface 45 of turret 22. Consequently, shank 16 can be firmly attached to mounting surface 45 of turret 22.

According to turning device 100 of the present disclosure, power transmitting coil 21 is installed in the plurality of power transmitting coil units 211 disposed around rotation axis 29 of turret 22. Accordingly, the power can be supplied only to power transmitting coil unit 211 that requires the electric supply. As a result, power consumption can be reduced.

According to turning device 100 of the present disclosure, turret 22 includes mounting surface 45 opposite to turning tool 10. A second recess 40 is provided in mounting surface 45. Each of the plurality of power transmitting coil units 211 is disposed in second recess 40.

According to turning device 100 of the present disclosure, turret 22 includes second nonmetallic film 46 that is disposed in second recess 40 and covers each of the plurality of power transmitting coil units 211. Accordingly, the waterproof property of each of the plurality of power transmitting coil units 211 can be enhanced.

According to turning device 100 of the present disclosure, second recess 40 includes second side wall surface 41 contiguous to mounting surface 45 and second bottom surface 42 contiguous to second side wall surface 41. Second nonmetallic film 46 includes a third surface 53 opposite to second bottom surface 42 and a fourth surface 54 located on an opposite side of third surface 53. Fourth surface 54 is located between mounting surface 45 and second bottom surface 42 in a direction along second side wall surface 41. Accordingly, second nonmetallic film 46 can be prevented from protruding from second recess 40 to ride on mounting surface 45 of turret 22. Consequently, shank 16 can be firmly attached to mounting surface 45 of turret 22.

It should be considered that the disclosed embodiment is illustrative and non-restrictive in every respect. The scope of the present invention is defined by not the description above, but the claims, and it is intended that all modifications within the meaning and scope of the claims and their equivalents are included in the present invention.

REFERENCE SIGNS LIST

1: first side surface (side surface), 2: second side surface, 3: diode, 4: mark, 8: first conductive coil unit, 9: first insulating coating unit, 10: cutting tool, 11: power receiving coil, 12: sensor, 13: controller, 14: wireless unit, 16: shank, 17: cutting insert, 18: second resonant capacitor, 19: rectifier circuit, 20: machine tool, 21: power transmitting coil, 22: turret, 23: power supply, 25: first resonant capacitor, 26: control device, 27: switch, 29: rotation axis, 30: first recess, 31: first side wall surface, 32: first bottom surface, 33: bottom board, 34: fixing unit, 35: mounting groove, 38: first nonmetallic film, 40: second recess, 41: second side wall surface, 42: second bottom surface, 43: second conductive coil unit, 44: second insulating coating unit, 45: mounting surface, 46: second nonmetallic film, 51: first surface, 52: second surface, 53: third surface, 54: fourth surface, 55: fifth surface, 56: sixth surface, 61: front end face, 62: rear end face, 63: front end unit, 64: rear end unit, 100: turning device, 101: first power receiving coil unit, 102: second power receiving coil unit, 111: power receiving coil unit, 112: rectifier circuit unit, 113: diode unit, 114: second nonmetallic film unit, 211: power transmitting coil unit, 212: switch unit, 311: first nonmetallic film unit, A: straight line, D1: first distance, D2: second distance, W1: first width, W2: second width, W3: third width

The invention claimed is:

1. A turning tool comprising:
   a power receiving coil that receives power transmitted from a power transmitting coil in a non-contact manner;
   a sensor electrically connected to the power receiving coil;
   a wireless circuit that transmits data detected by the sensor to an outside;
   a cutting insert; and
   a shank that holds the cutting insert,
   wherein the power receiving coil is disposed in the shank,
   the power receiving coil includes a first power receiving coil circuit and a second power receiving coil circuit separated from the first power receiving coil circuit,
   the shank includes a first side surface and a second side surface that is contiguous to the first side surface and is inclined with respect to the first side surface,
   the first power receiving coil circuit is provided in the first side surface, and
   the second power receiving coil circuit is provided in the second side surface.

2. The turning tool according to claim 1, wherein
   a first recess is provided on a side surface of the shank, and
   the power receiving coil is disposed in the first recess.

3. The turning tool according to claim 2, further comprising a first nonmetallic film that is disposed in the first recess and covers the power receiving coil.

4. The turning tool according to claim 3, wherein
   the first recess includes a first side wall surface contiguous to the side surface and a first bottom surface contiguous to the first side wall surface,
   the first nonmetallic film includes a first surface opposite to the first bottom surface and a second surface on an opposite side of the first surface, and
   the second surface is located between the side surface and the first bottom surface in a direction along the first side wall surface.

5. The turning tool according to claim 1, wherein the power receiving coil includes a plurality of power receiving coil circuits disposed along a longitudinal direction of the shank.

6. The turning tool according to claim 5, further comprising a first nonmetallic film that is disposed in a first recess and covers each of the plurality of power receiving coil units,
   wherein the first recess in which each of the plurality of power receiving coil circuits is disposed is provided in a side surface of the shank.

7. The turning tool according to claim 6, wherein the first recess includes a first side wall surface contiguous to the side surface and a first bottom surface contiguous to the first side wall surface, the first nonmetallic film includes a first surface opposite to the first bottom surface and a second surface located on an opposite side of the first surface, and the second surface is located between the side surface and the first bottom surface in a direction along the first side wall surface.

8. The turning tool according to claim 6, wherein the first nonmetallic film is a translucent resin.

9. The turning tool according to claim 6, wherein the first nonmetallic film is a non-translucent resin, and a mark indicating a cutting position of the shank is provided on the shank.

10. The turning tool according to claim 5, wherein an interval between two adjacent power receiving coil circuits among the plurality of power receiving coil circuits becomes shorter with increasing distance from the cutting insert.

11. A turning tool comprising:

a power receiving coil that receives power transmitted from a power transmitting coil in a non-contact manner;

a sensor electrically connected to the power receiving coil; and a wireless circuit that transmits data detected by the sensor to an outside, wherein the power receiving coil includes a plurality of power receiving coil circuits disposed along a longitudinal direction of the shank, and the plurality of power receiving coil circuits are alternately arranged on both sides of a straight line parallel to the longitudinal direction.

12. A turning tool comprising:

a power receiving coil that receives power transmitted from a power transmitting coil in a non-contact manner;

a sensor electrically connected to the power receiving coil; and a wireless circuit that transmits data detected by the sensor to an outside, wherein the power receiving coil includes a plurality of power receiving coil circuits disposed along a longitudinal direction of the shank, the shank includes a front end face to which the cutting insert is attached, a rear end face located on an opposite side of the front end face, and a side surface located between the front end face and the rear end face, each of the plurality of power receiving coil circuits includes a front end opposite to the front end face and a rear end opposite to the rear end face, and each of the plurality of power receiving coil circuits is inclined with respect to the side surface such that a distance between the front end and the side surface is smaller than a distance between the rear end and the side surface.

* * * * *